(12) United States Patent
Hooper et al.

(10) Patent No.: US 9,814,992 B2
(45) Date of Patent: *Nov. 14, 2017

(54) INDUCTION LIGHT TOY AND RELATED METHODS

(71) Applicant: Factor 10 LLC, New Orleans, LA (US)

(72) Inventors: Luke Hooper, New Orleans, LA (US); Yi Liang, Portland, OR (US); Casey Schneider, New Orleans, LA (US); Tony Cohen, Cincinnati, OH (US)

(73) Assignee: Factor 10 LLC, New Orleans, LA (US)

( * ) Notice: Subject to any disclaimer, the term of this patent is extended or adjusted under 35 U.S.C. 154(b) by 235 days.

This patent is subject to a terminal disclaimer.

(21) Appl. No.: 14/685,562

(22) Filed: Apr. 13, 2015

(65) Prior Publication Data
US 2015/0283470 A1    Oct. 8, 2015

Related U.S. Application Data

(63) Continuation of application No. 14/246,353, filed on Apr. 7, 2014, now Pat. No. 9,061,216.

(51) Int. Cl.
*A63F 9/00* (2006.01)
*A63H 3/00* (2006.01)
(Continued)

(52) U.S. Cl.
CPC ......... *A63H 3/006* (2013.01); *A63F 3/00643* (2013.01); *A63H 3/28* (2013.01);
(Continued)

(58) Field of Classification Search
None
See application file for complete search history.

(56) References Cited

U.S. PATENT DOCUMENTS 3,984,109 A    10/1976    Wiles
5,158,492 A    10/1992    Rudell et al.
(Continued)

FOREIGN PATENT DOCUMENTS

CN    2467144 Y    12/2001
DE    10024648 A1    11/2001
(Continued)

OTHER PUBLICATIONS

International Search Report and Written Opinion in International Application No. PCT/US2015/024708. International Filing Date: Apr. 7, 2015. dated Nov. 3, 2015.
(Continued)

*Primary Examiner* — Seng H Lim
(74) *Attorney, Agent, or Firm* — Jason P. Mueller; Adams & Reese LLP

(57) ABSTRACT

A light-emitting toy assembly including a field generator that includes a first transmitting coil configured to inductively transmit energy and an object. The object includes a body, at least a part of which is translucent, at least one receiving coil configured to inductively receive energy from the first transmitting coil, and a lighting element having at least one light emitting diode that is configured to receive a current from a corresponding one of the at least one receiving coils. At least one of the first transmitting coil and the object is movable with respect to the other of the first transmitting coil and the object. A change in a rotational orientation of at least one of the first transmitting coil and the object alters a lighting state of the lighting element.

33 Claims, 17 Drawing Sheets

(51) Int. Cl.
  *A63H 33/04* (2006.01)
  *A63H 33/22* (2006.01)
  *A63H 33/26* (2006.01)
  *A63H 3/28* (2006.01)
  *H02J 50/10* (2016.01)
  *H05B 33/08* (2006.01)
  *A63F 3/00* (2006.01)
  *H02J 7/02* (2016.01)

(52) U.S. Cl.
  CPC .......... *A63H 33/042* (2013.01); *A63H 33/22* (2013.01); *A63H 33/26* (2013.01); *H02J 50/10* (2016.02); *H05B 33/0863* (2013.01); *A63F 2003/00652* (2013.01); *A63F 2003/00665* (2013.01); *H02J 7/025* (2013.01)

(56) References Cited

U.S. PATENT DOCUMENTS

| | | | |
|---|---|---|---|
| 5,197,741 | A | 3/1993 | Wu |
| 5,251,904 | A | 10/1993 | Cruz |
| 6,016,038 | A | 1/2000 | Mueller et al. |
| 6,325,690 | B1 | 12/2001 | Nelson |
| 6,389,318 | B1 | 5/2002 | Zarinetchi et al. |
| 6,816,029 | B2 | 11/2004 | Choi et al. |
| 6,835,131 | B1 | 12/2004 | White et al. |
| 6,937,152 | B2 | 8/2005 | Small |
| 6,967,448 | B2 | 11/2005 | Morgan et al. |
| 7,255,624 | B2 | 8/2007 | Daftari |
| 7,361,074 | B1 | 4/2008 | Periman et al. |
| 7,500,917 | B2 | 3/2009 | Barney et al. |
| 7,731,558 | B2 | 6/2010 | Capriola |
| 8,177,601 | B2 | 5/2012 | Ekstein-Lieberman |
| 8,247,987 | B2 | 8/2012 | Nakajo et al. |
| 8,294,542 | B2 | 10/2012 | Wang et al. |
| 8,393,906 | B2 | 3/2013 | Norman et al. |
| 8,602,857 | B2 | 12/2013 | Morichau-Beauchant et al. |
| 2002/0116100 | A1 | 8/2002 | Shimazaki et al. |
| 2006/0084357 | A1 | 4/2006 | Rosen et al. |
| 2007/0117602 | A1 | 5/2007 | Madigou et al. |
| 2007/0176727 | A1 | 8/2007 | Chen et al. |
| 2007/0184722 | A1 | 8/2007 | Doherty |
| 2009/0053971 | A1 | 2/2009 | Hui |
| 2009/0174358 | A1 | 7/2009 | Russ |
| 2009/0184468 | A1 | 7/2009 | Huang |
| 2011/0210621 | A1* | 9/2011 | Iwaisako ............ A61B 1/00029 307/104 |
| 2011/0248807 | A1 | 10/2011 | Wang et al. |
| 2012/0127695 | A1 | 5/2012 | Tran et al. |
| 2012/0329359 | A1 | 12/2012 | Capriola |
| 2014/0028186 | A1 | 1/2014 | Montemayor et al. |

FOREIGN PATENT DOCUMENTS

| | | |
|---|---|---|
| EP | 1606031 A1 | 12/2005 |
| EP | 2022533 A1 | 2/2009 |
| KR | 100939166 B1 | 1/2010 |
| WO | WO-9713563 A1 | 4/1997 |
| WO | WO-2006020486 A2 | 2/2006 |
| WO | WO-2010011109 A2 | 1/2010 |
| WO | WO-2012023935 A1 | 2/2012 |
| WO | WO-2012067551 A1 | 5/2012 |
| WO | WO-2012118368 A1 | 9/2012 |

OTHER PUBLICATIONS

Invitation to Pay Additional Fees and, Where Applicable Protest Fee, issued in corresponding International Application No. PCT/US2015/024708 dated Jun. 19, 2015.
Education, Laser Pegs, pp. 1-10, printed on Nov. 26, 2013, available online at http://laserpegs.com/education.
Lighted LED Chess Set, pp. 1-2, printed on Nov. 26, 2013, available online at http://www.brookstone.com/lighted-led-chess-set.

* cited by examiner

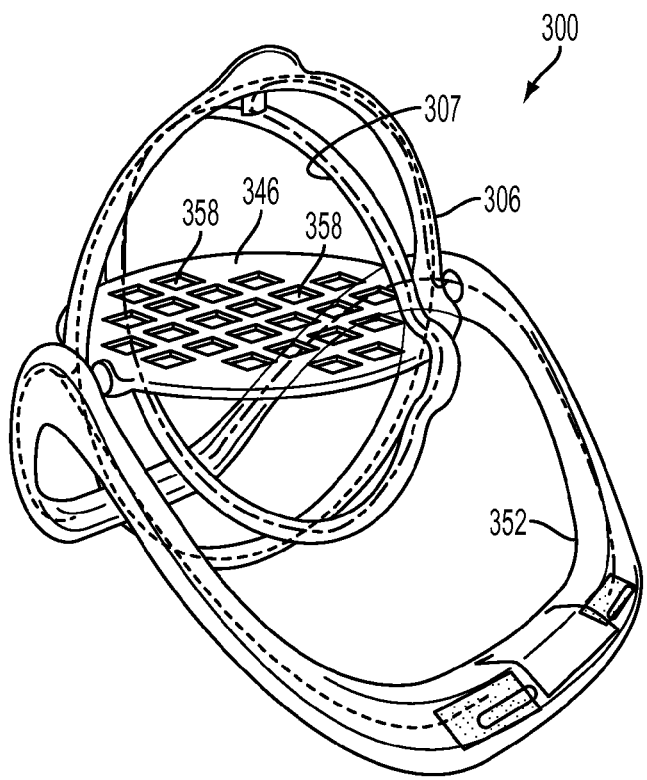
FIG. 9
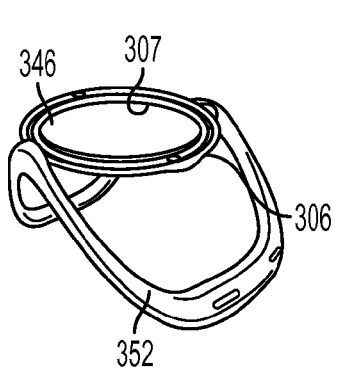
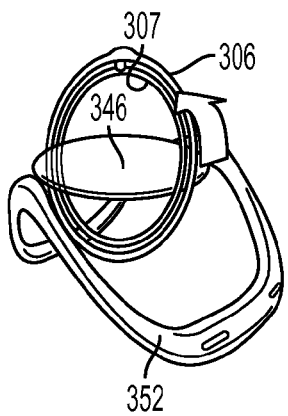
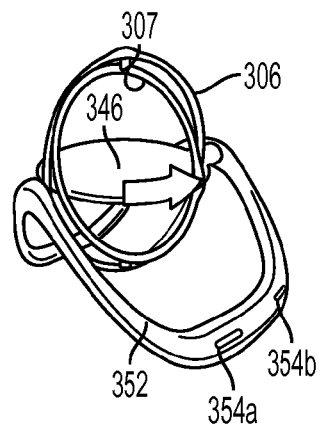
FIG. 10A   FIG. 10B   FIG. 10C

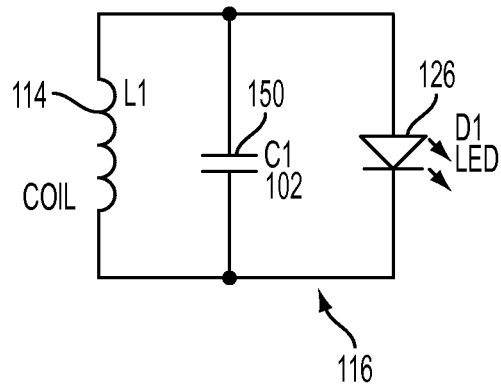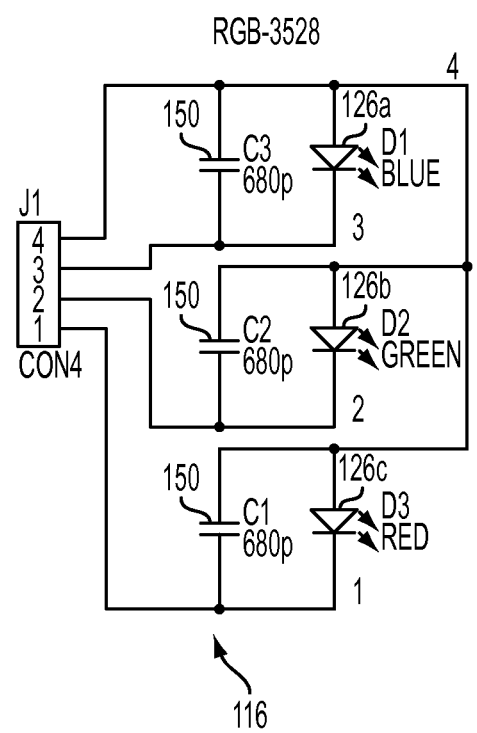
FIG. 14A                    FIG. 14B

INDUCTION LIGHT TOY AND RELATED METHODS

CROSS-REFERENCE TO RELATED APPLICATION

This application is a Continuation of U.S. application Ser. No. 14/246,353, filed Apr. 7, 2014, which is incorporated by reference in its entirety.

TECHNICAL FIELD

The present invention relates generally to an inductively powered lighting assembly and related methods. More specifically, the present invention relates to an interactive, inductively powered lighting assembly used in toys, games, and other recreational or educational apparatus, and related methods.

BACKGROUND

Electromagnetic induction is the generation of a voltage or potential difference across a conductor when the conductor is exposed to a varying magnetic field. Recently, induction has been used in consumer products for performing wireless charging of electronic devices, such as mobile phones.

In the realm of toys and games, conventional board games have used induction to cause a piece of the game to light up when placed on the board. However, existing induction-lighted toys and games are somewhat simplistic implementations that allow for limited or no variability or configurability with respect to the light emitted by the game piece or toy.

SUMMARY

In an embodiment, a light-emitting toy assembly is provided that comprises a field generator that includes a first transmitting coil configured to inductively transmit energy, and an object that includes: a body, at least a part of which is translucent, at least one receiving coil being configured to inductively receive energy from the first transmitting coil, and a lighting element having at least one light emitting diode that is configured to receive a current from a corresponding one of the at least one receiving coils, wherein at least one of the first transmitting coil and the object is movable with respect to the other of the first transmitting coil and the object, and a change in a rotational orientation of at least one of the first transmitting coil and the object alters a lighting state of the lighting element.

In an embodiment, a light-emitting toy assembly is provided that comprises an induction transmitting coil in a first housing; two or more induction receiving coils in a second housing separate from the first housing; and two or more lights in the second housing that are each a different color from the other and that are each connected to a corresponding one of the two or more induction receiving coils, wherein at least one of a relative orientation and relative position between the induction transmitting coil and the two or more induction receiving coils is variable.

In an embodiment, a board game is provided that comprises a platform; at least one transmitting coil positioned substantially around the platform and configured to generate an electromagnetic field to inductively transfer energy; and a plurality of game pieces configured to be positioned on the platform. Each of the plurality of game pieces includes: a body, at least a portion of which is translucent; at least one receiving coil configured to inductively receive energy from the electromagnetic field of the at least one transmitting coil; and a lighting element within the body and comprising at least one light emitting diode configured to receive a current from a corresponding one of the at least one receiving coils. The at least one transmitting coil is rotatable with respect to the platform about an axis of rotation.

In an embodiment, a toy set is provided that comprises a field generator including at least one transmitting coil configured to inductively transmit energy; and a doll having an exterior of which at least a portion is translucent, and the exterior confining an interior cavity. The interior cavity contains: at least one receiving coil configured to inductively receive energy from the at least one transmitting coil; and a lighting element comprising at least one light emitting diode configured to receive a current from a corresponding one of the at least one receiving coils. The at least one transmitting coil and the doll are relatively movable with respect to each other, and a relative movement of the doll with respect to the at least one transmitting coil alters a lighting state of the lighting element.

In an embodiment, a building block set is provided that comprises at least one transmitting coil configured to inductively transmit energy; and a plurality of building blocks. Each building block has an outer surface, at least a portion of which is translucent, and has an interior cavity containing: at least one receiving coil configured to inductively receive energy from the at least one transmitting coil; and a lighting element including at least one light emitting diode, each of the at least one light emitting diodes being configured to receive a current from a corresponding one of the at least one receiving coils. The building block set also comprises a platform to support the plurality of building blocks.

BRIEF DESCRIPTION OF DRAWINGS

The foregoing aspects and other features and advantages of the invention will be apparent from the following drawings.

in FIG. 3B, receiving coils wound around the cores; and in FIG. 3C, the receiving coils and cores fitted into the base section and connected to a lighting element.

FIG. 4A shows the receiving coils and lighting element within the doll, and FIG. 4B shows an example of the exterior of the doll.

FIG. 9 shows an embodiment of a board game including a light-emitting assembly having two transmitting coils.

FIGS. 10A, 10B, and 10C show example positions of the transmitting coils of FIG. 9, in various states of rotation.

FIGS. 14A and 14B show embodiments of circuit diagrams of a lighting element.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited anywhere in this specification, including the Background and Detailed Description sections, are incorporated by reference as if each had been individually incorporated.

The terms "toy" and "toy assembly" as used herein are general terms to describe a variety of embodiments of the current invention. For example, "toy" and "toy assembly" can encompass party games, board games, dolls and doll play sets, building block sets, educational toys, decorations, and novelties, and the like. However, "toy" and "toy assembly" are not limited to these examples and encompass a wide range of recreational and educational devices.

The term "coil" refers to a wire or other conductor (e.g., a PCB) at least a portion of which has a shape that is substantially closed in a circumferential direction, such as a spiral, circle, or other geometric shape or polygon. As used herein, "coil" is not limited to a perfectly circular shape. A coil may also have a rectangular or other geometric shape, or other irregular shapes. A coil may be wound with or without a gap, and may or may not be wound around an object.

The term "translucent" refers to the physical property (or to a material or object having the physical property) of allowing light to pass through a material or object, with or without light scatting. Therefore, as used herein, a translucent material or object may include an object or material that is "transparent," i.e., allowing light to pass through a material or object without being scattered. However, a translucent material or object may also include an object that that allows light to pass through with scattering.

Figure 1:
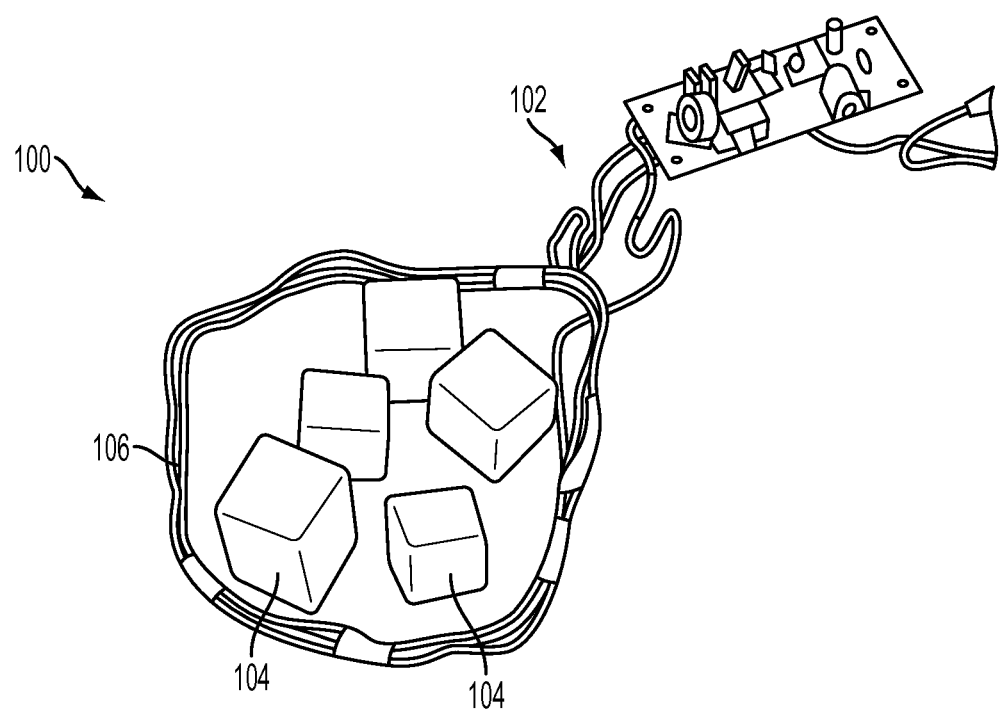
FIG. 1 shows an embodiment of a light-emitting toy assembly.

FIG. 1 shows an embodiment of a light-emitting toy assembly 100.

Figure 2:
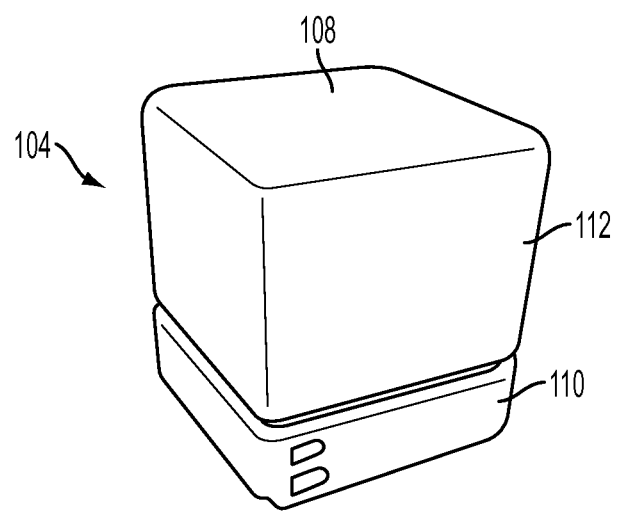
FIG. 2 shows an embodiment of a light-emitting object of the light-emitting assembly.

The light-emitting toy assembly 100 can include a field generator 102 and one or more light-emitting objects 104. The field generator 102 can include a transmitting coil 106 that inductively transmits energy according to the principles of electromagnetic induction. The object 104 can inductively receive energy from the transmitting coil 106. FIG. 1 shows multiple objects 104 surrounded by the transmitting coil 106. A close-up of one of these objects 104 is shown in FIG. 2. The object 104 in FIG. 2 includes an outer body 108 having a base section 110 and a top section 112, however other embodiments, including monolithic objects 104, are possible.

Figures 3A, 3B:
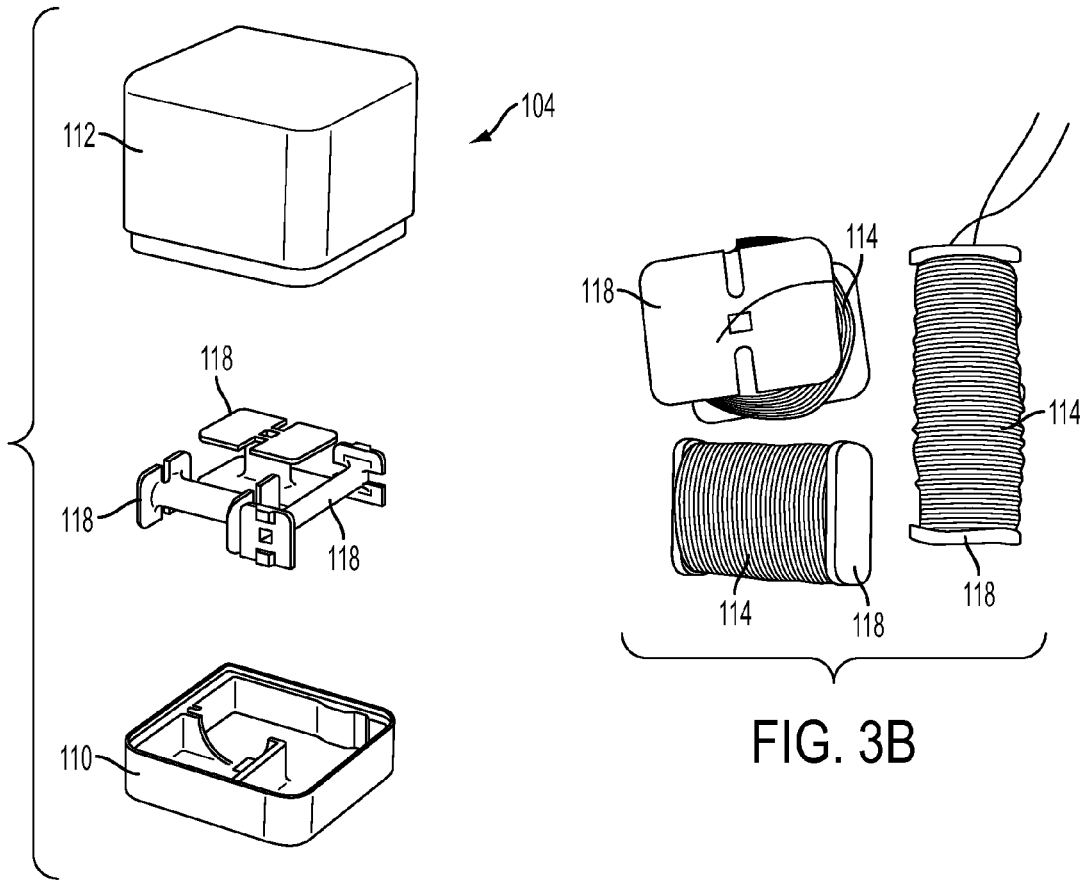
FIGS. 3A, 3B, and 3C show components of an embodiment of the light-emitting object, including in FIG. 3A, an exploded view of the object with the body, base section of the body, and cores.
Figure 3C:
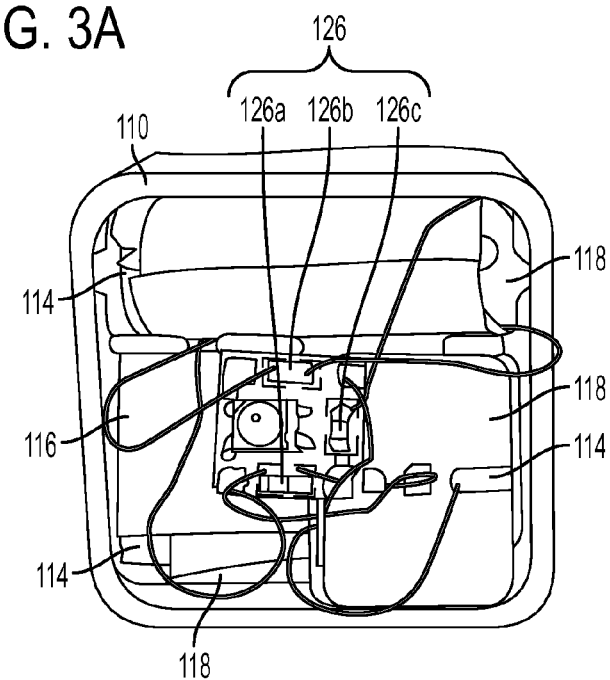

FIG. 3A shows an exploded view of the object 104 according to the embodiment shown in FIG. 2. The object 104 may include, for example, the body 108 (shown, for example, as base section 110 and top section 112), at least one receiving coil 114 (see FIG. 3B), and a lighting element 116. The body 108 may include a plurality of cores 118 (see FIG. 3A) around which separate receiving coils 114 can be wound, as shown in FIG. 3B. The cores 118 may be fitted into the base section 110, which may include compartments for holding and/or separating the cores 118. While FIGS. 3A, 3B, and 3C depict three cores 118 and receiving coils 114, other embodiments may have fewer or more cores 118 and receiving coils 114, depending on the specific application.

For simplicity, portions of the following will refer to "the receiving coil." It should be understood, however, that embodiments of the current invention may include one or multiple receiving coils. Therefore, descriptions herein that refer to a receiving coil in the singular sense can, where appropriate, apply to any number of receiving coils that may be included in some embodiments.

Figure 4A:
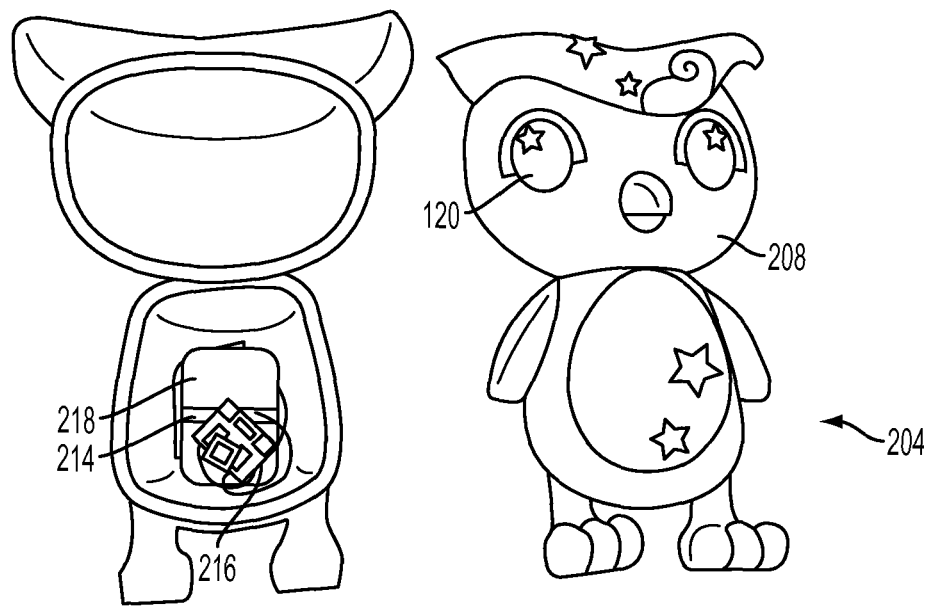
FIGS. 4A and 4B show an embodiment of a light-emitting object in the form of a doll.
Figure 4B:
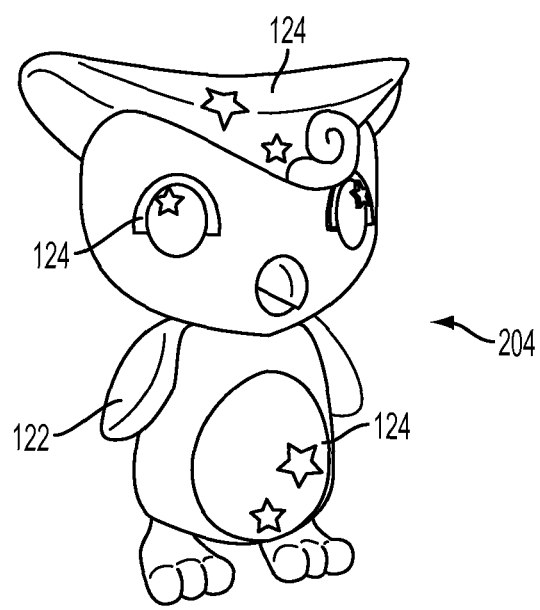

The body of the light-emitting object can take various forms depending on the particular embodiment. In some embodiments, the body has a rectangular parallelepiped or cubic shape, such as the body 108 shown in FIGS. 1-3. However, other shapes are possible. For example, FIGS. 4A and 4B show an embodiment with a body 208 formed as a doll 204 or figurine. These and other embodiments will be discussed in further detail below. However, the form of the body is not limited to these examples, and other shapes and forms are possible.

Referring to FIG. 4A, the body 108 can have one or more translucent portions 120 through which light can at least partially pass. The translucent portion 120 may cover substantially all of the body, or only a select area or areas. In some embodiments, the entire body 108 may be made of a translucent material. According to an embodiment shown in FIG. 4A, a body 208 is made of a translucent material and is uncoated. However, the body 208 may be selectively coated with a substantially opaque coating 122, as shown in FIG. 4B. The translucent portions 120 of the body 108 may be left uncoated, or may be coated with a translucent coating 124. The translucent coating 124 may have a finish or coloring to affect the light shining through the translucent coating 124. For example, the translucent coating 124 may have a metallic appearance.

According to embodiments, the receiving coil 114 of the object 104 inductively receives energy from the transmitting coil 106. When inductively receiving energy, a current is induced in the receiving coil 114 and that current is used to power the lighting element 116 to produce light. The light can then be seen on the exterior of the light-emitting object 104 due to the translucent portions 120 of the body 106. Referring to FIG. 3C, the lighting element 116 may emit light via, for example, a light emitting diode (LED) 126, or some other light emitting element, such as a conventional light bulb. In addition, the lighting element 116 may include multiple LEDs 126a, 126b, 126c, as shown in FIG. 3C, each of which may emit a different color light. For example, the lighting element may include an RGB LED. An RGB LED is capable of producing red, green, and blue light, as well as other colors via a combination of the red, green, and blue lights. Therefore, in some embodiments, the body 108 is capable of exhibiting up to six colors of light corresponding to the three single colors of the RGB LED, as well as the three colors from combining any two of the single colors of the RGB LED. However, it is possible that differently colored LEDs or other numbers of LEDs and/or different configurations of receiving coils 114 can be provided to produce different light color combinations. Additionally, in RGB embodiments, three individual LEDs can be used in place of an RGB LED. As discussed above, the lighting element is not limited to an LED-type lighting element, and may include any number of light emitting materials, devices, or mechanisms, which may be in a variety of forms and shapes. For example, in some embodiments, the lighting element may include light sheets or flexible LED sheets, or electroluminescent wire (or EL wire), as well as other alternatives. Accordingly, while embodiments discussed herein refer to LEDs, those embodiments are not limited to LEDs.

As discussed above, the body may include two or more receiving coils 114, as well as two or more LEDs 126. In the case of multiple receiving coils 114, each LED 126 may be powered by current from a separate receiving coil 114. For example, the input terminals of each LED 126 can be electrically coupled to the output of one of the receiving coils. In this way, a given LED 126 may be configured to only generate light when the receiving coil 114 corresponding to that LED 126 has an induced current. The lighting element 116, therefore, may be able to produce light having a color corresponding to the light color from any single LED or light having a color corresponding to a combination of differently colored LEDs, as discussed above. According to embodiments, the use of receiving coils 114 to power the lighting element 116 can eliminate the need for the object 104 to have an on board power supply, such as a battery.

Figure 5:
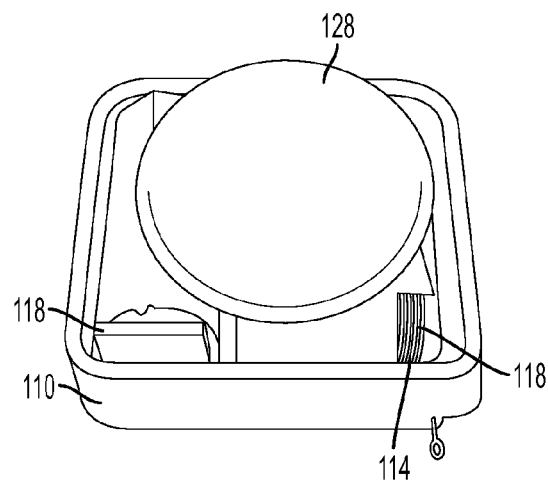
FIG. 5 shows an embodiment of a light diffuser covering a lighting element.

Referring to FIG. 5, to achieve a desirable outward appearance of light emitted from the object 104, a light diffuser 128 can be disposed within the body 108. In some embodiments, the light diffuser 128 is a translucent material with a dome shape, or it may be formed as a lens. FIG. 5 shows an example of a dome shaped diffuser 128 made of a translucent material.

The strength of the light may vary according to the position of the object 104 within the electromagnetic field of the field generator 102. As a receiving coil 114 is positioned within a stronger portion of the electromagnetic field generated by the transmitting coil 106, the light can become brighter. According to embodiments, the magnetic field is strongest at the center of the transmitting coil 106, and decreases with axial distance from the center. In some embodiments, the magnetic field may be strongest near the edge of the coil (e.g., adjacent to the coil). In addition, orientation of the receiving coil 114 with respect to the transmitting coil 106 can vary the strength of the current induced in the receiving coil 114, with the current being the strongest when the receiving coil 106 is oriented perpendicular to the field lines of the electromagnetic field in the vicinity of the receiving coil, and the current being the weakest when the receiving coil 106 is oriented parallel to the field lines of the electromagnetic field in the vicinity of the receiving coil.

Figure 6A:
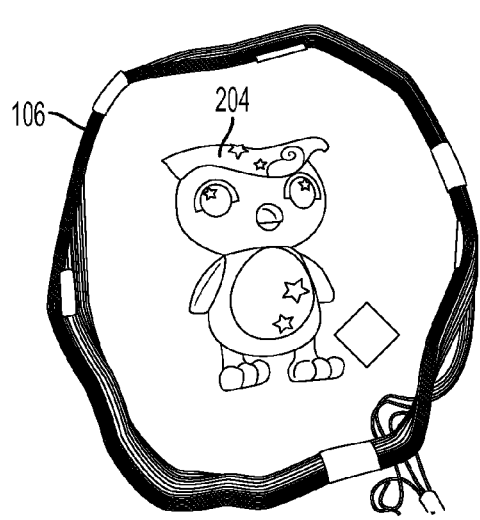
FIGS. 6A and 6B show an embodiment of a light-emitting object in the form of a doll positioned, in FIG. 6A, in a first orientation with respect to a transmitting coil; and in FIG. 6B, in a second orientation with respect to the transmitting coil.
Figure 6B:
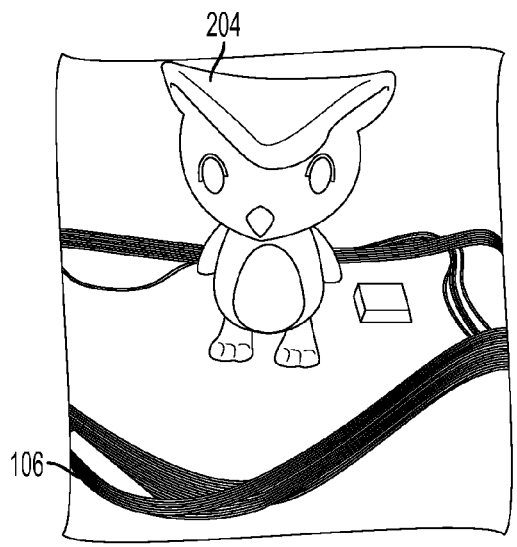

At least one of the transmitting coil 106 and the object 104 is movable with respect to the other. A change in a rotational orientation of the transmitting coil 106 or the object 104 alters a lighting state of the lighting element 116 in accordance with the principles of electromagnetic induction and the configuration of the receiving coil 114 within the object 104. For example, the object 204 according to the embodiment in FIG. 6A has a first orientation with respect to the transmitting coil 106 and exhibits a certain lighting state. In FIG. 6B, however, the object 204 has been rotated ninety degrees with respect to the transmitting coil 106 and, as a result, exhibits a different lighting state. Therefore, the lighting element 216 of object 204 and thus the light effect of the object 204 can be controlled by manipulating the orientation of the object 204 and/or the transmitting coil 106.

In order for each LED 126 to be selectively lit by an induced current in each corresponding receiving coil 114, each receiving coil 114 may be configured to inductively receive energy under select circumstances. For example, a receiving coil 114 may be inductively matched to one or more transmitting coils 106. The higher the degree of inductance matching between transmitting coil and receiving coil, the greater the current induced in the receiving coil. Thus, the receiving coil 114 will preferentially receive energy from the matched one or more transmitting coils 106. In some embodiments, only some receiving coils 114 are sufficiently inductance matched to the transmitting coil 106 to generate light in the lighting element 116.

Figure 7:
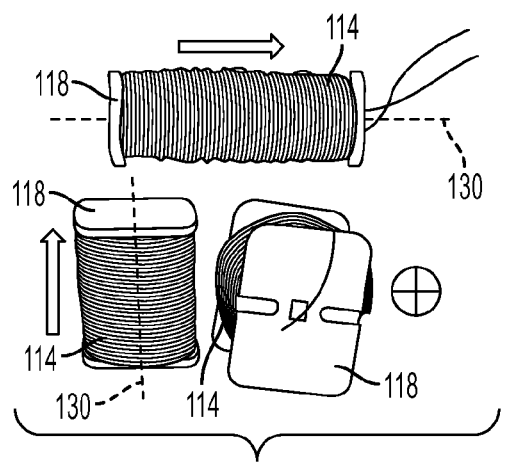
FIG. 7 shows an embodiment of a collection of three receiving coils with different orientations.

Referring to FIG. 7, in some embodiments, each of the receiving coils 114 has a central axis 130, which may have a different orientation from the central axes 130 of the other receiving coils 114. In an embodiment, the central axis 130 of each receiving coil 114 is substantially perpendicular to the central axis 130 of each other receiving coil 114, as shown in FIG. 7, however, other embodiments are possible. In FIG. 7, the arrows show the respective directions of the central axes 130, with the axis 130 of the lower right coil 114 being into the page.

According to the principles of induction, the energy received by each receiving coil 114 varies based on a relative orientation between the transmitting coil 106 and the receiving coil 114, which is within the light-emitting object 104. Therefore, by having differently oriented receiving coils 114 that are each electrically coupled to an LED 126, a relative change in orientation between the object 104 and the transmitting coil 106 will cause the object 104 to exhibit varying lighting states in which one or more of the LEDs 126 is turned on or off, or are in various states between on and off. For example, FIGS. 6A and 6B show an embodiment where a rotation of the object 204 with respect to the transmitting coil 106 changes the lighting state of the object 204. In other words, in embodiments where each central axis 130 is substantially perpendicular to the other central axes 130, one of the receiving coils 114 may be parallel to a central axis 132 of a transmitting coil 106, while the other receiving coils 114 are at right-angles to the central axes 132 of the transmitting coil 106. Therefore, only the receiving coil 114 that is aligned with the transmitting coil 106 will inductively receive energy.

As discussed further below, two perpendicular receiving coils 114 may simultaneously have an induced current and therefore their corresponding LEDs 126 may emit light in a given orientation due to the configuration of the first and second receiving coils 114a and 114b and transmitting coil 106. For example, both of the coils 114a, 114b can be oriented somewhere between perpendicular and parallel to the first transmitting coil causing both LEDs 126 to emit light somewhere between "full power" and "no power," resulting in a color blend between the colors of the two LEDs 126. This same principal can also be applied to arrangements of three or more LEDs 126 and connected receiving coils 114. Both the first and second LEDs 126a and 126b may simultaneously emit some light during a transition from the first orientation to the second orientation of the body 108 due to a partial alignment of two receiving coils 114 with a transmitting coil 106 during the transition. One or more additional transmitting coils can be included, with different orientations than the first transmitting coil 106, to add additional colors or combinations of colors.

As discussed above with respect to FIGS. 3A-3C, the light-emitting object 104 may also include one or more cores 118. Any of the at least one receiving coils 114 may be wound around a respective core 118. The core 118 may be made out of various materials, including polymer, plastic, ceramic, or metallic materials, including magnetic materials, such as iron, or any other suitable material. Magnetic cores may be used to affect (e.g., increase) the inductance.

Figure 8A:
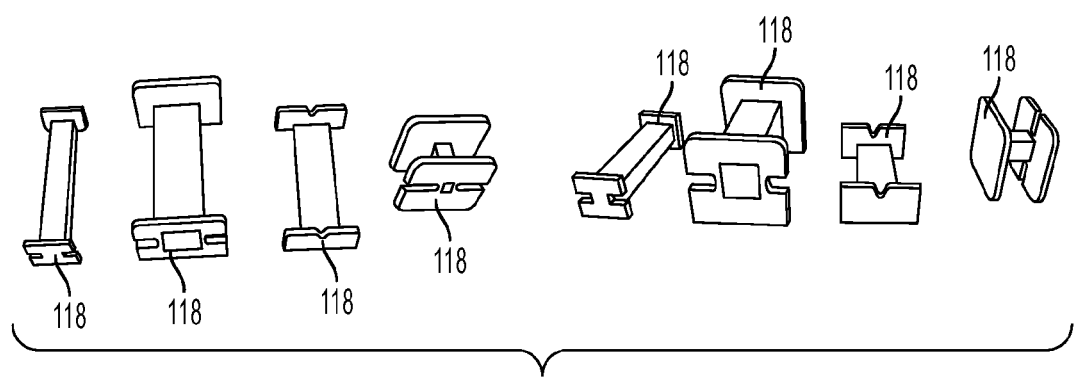
FIGS. 8A, 8B, and 8C show various embodiments of cores and receiving coils.
Figure 8B:
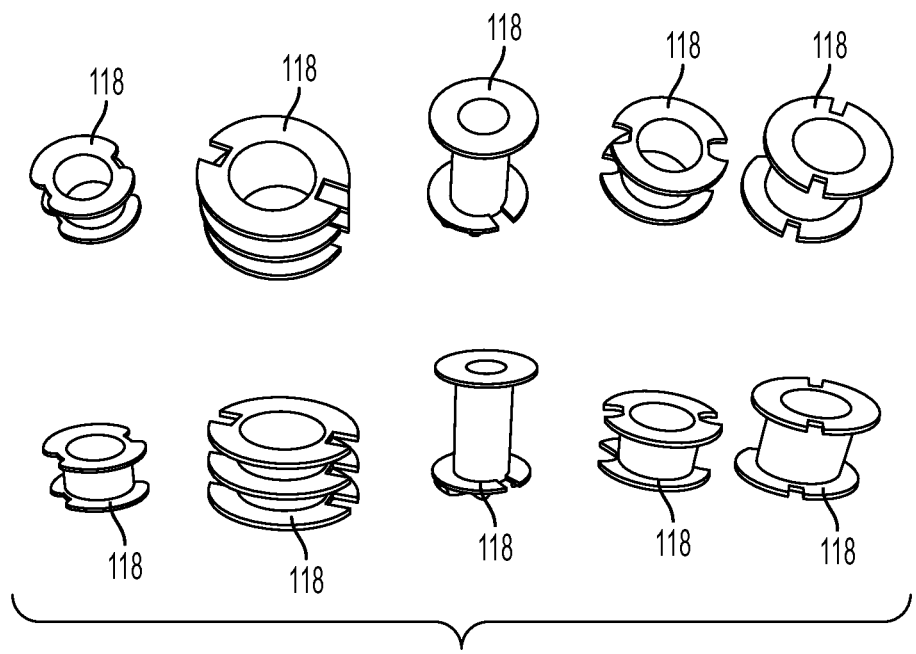
Figure 8C:
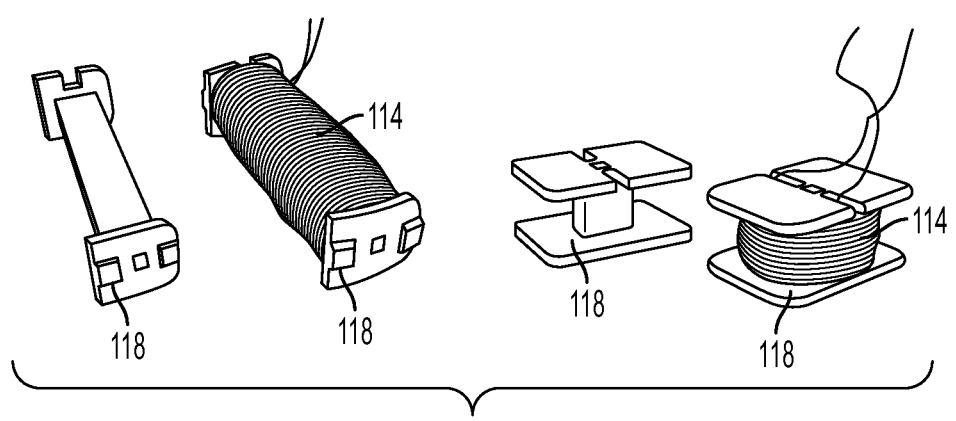

Additionally, the cores 118 can be made in different shapes and sizes to provide differently shaped or sized receiving coils 114. This can include varying the length, width, lateral cross-section, wire diameter, or wire material of a coil. In the case of multiple receiving coils, each receiving coil 114 may have the same or a different shape and size. FIGS. 8A-8C show a variety of cores 118 of different shapes and sizes according to various embodiments. FIG. 8A shows examples of cores 118 having square or rectangular shapes, while FIG. 8B shows examples of circular cores 118. In addition, FIG. 8C shows examples of two cores 118, each shown with and without a receiving coil 114.

As mentioned above, the light-emitting toy assembly in some embodiments may include at least a second transmitting coil that also inductively transmits energy. FIG. 9 shows a light-emitting toy assembly 300 according to such an embodiment. The assembly 300 has a first transmitting coil 306 and a second transmitting coil 307. The embodiment shown in FIG. 9 is related to a board game, which is discussed further below. While this embodiment is shown as an example of two transmitting coils 306 and 307, the configuration of two transmitting coils is not limited to this embodiment. Also, other embodiments may have three transmitting coils or more.

A receiving coil may inductively receive energy from the second transmitting coil, in addition to the first transmitting coil. Alternatively, it is possible that a given receiving coil may be specifically tuned to receive energy from only one of the first or second transmitting coils. According to embodiments, the two or more transmitting coils may be fixed with respect to one another, movable with respect to one another, or a combination of the two. For example, according to the embodiment of FIGS. 9, 10A, 10B, and 10C, the second transmitting coil 307 and the first transmitting coil 306 may be configured to move with respect to each other. Thus, the relative orientation between the two transmitting coils 306 and 307 may be varied by, for example, rotating either one of the transmitting coils 306, 307. In other embodiments, the first transmitting coil 306 may be structurally connected to the field generator, and the second transmitting coil 307 may be separate from and movable with respect to the field generator.

The light-emitting toy assembly 100 may further include a passive coil (not pictured). While the passive coil may be of a similar construction to the transmitting coil 106, embodiments of the passive coil may not be independently powered to form an electromagnetic field. Instead, the passive coil can inductively receive energy from one or more of the transmitting coils and, by the resulting induced current in the passive coil, reinforces or extends the electromagnetic field. Accordingly, the passive coil can extend the range within which the transmitting coils can inductively transmit energy. In the context of a block stacking game, one or more transmitting coil can be located at the base of the game, and one or more passive coils can be located at a distance above the base of the game, allowing the blocks to illuminate at a greater distance from the base then would be possible without the passive coil(s).

Figure 11:
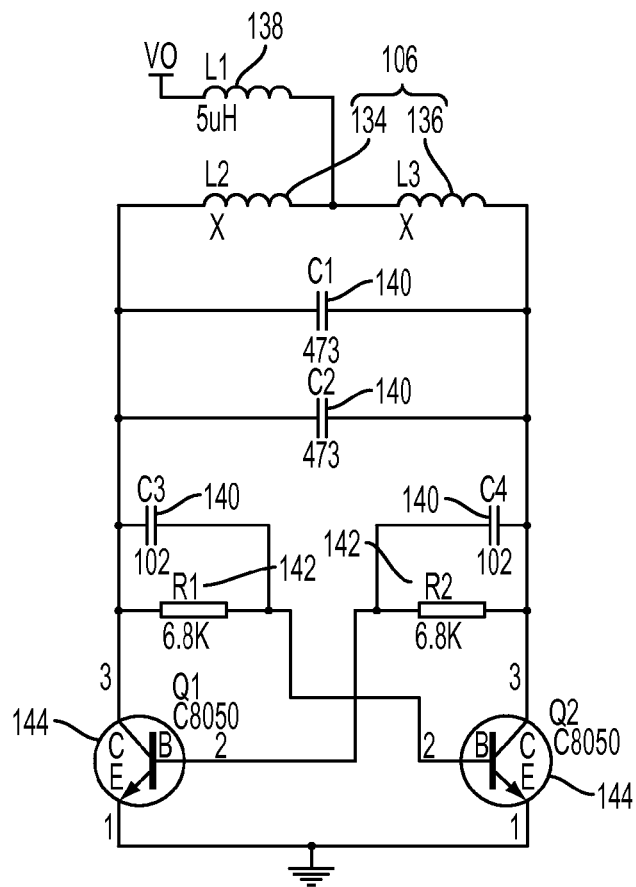
FIG. 11 shows an embodiment of a circuit diagram for a field generator of a light-emitting assembly.

The field generator 102 with the first transmitting coil 106 may, in some embodiments, be a free oscillator. FIG. 11 shows an example of a circuit board diagram for the field generator 102 according to an embodiment. The transmitting coil 106 can include a first inductor 134 and a second inductor 136 which are coils aligned along a common central axis and having inverse polarities. The field generator 102 may also include a current limit inductor 138 connected in series to the first transmitting coil 106, as well as a plurality of capacitors 140, resistors 142, and transistors 144. In some embodiments, the emitting inductor and the capacitor may be value matched to generate a set frequency. Capacitors and transistors may have a high voltage value to help dissipate heat.

Figure 12:
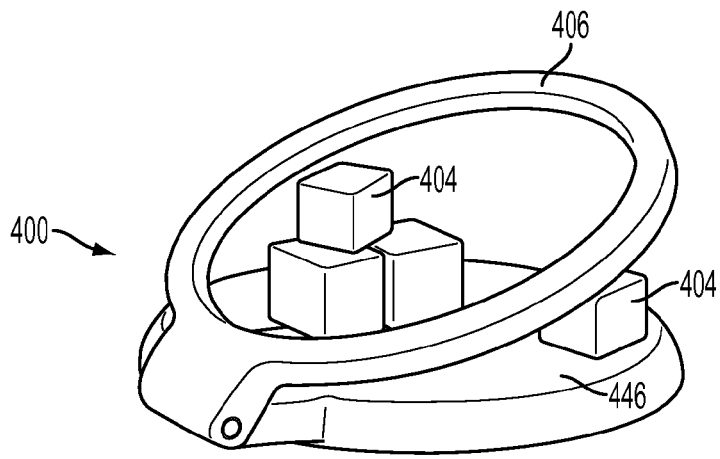
FIG. 12 shows an embodiment of a building block set incorporating a light-emitting assembly.

The light-emitting toy assembly 100 according to some embodiments may also include a platform to support the light-emitting objects 104. For example, FIG. 12 shows a light-emitting toy assembly 400 according to an embodiment that has a platform 446 to support the objects 404. In addition, the first transmitting coil 406 can be integral with or connected to the platform 446. As shown in FIG. 9, a second transmitting coil and/or a passive coil may also be integral with or otherwise associated with a platform 346. In various embodiments, any of the first transmitting coil 106, second transmitting coil 107, and/or a passive coil may be fixed or movable relative to a platform.

Figure 13A:
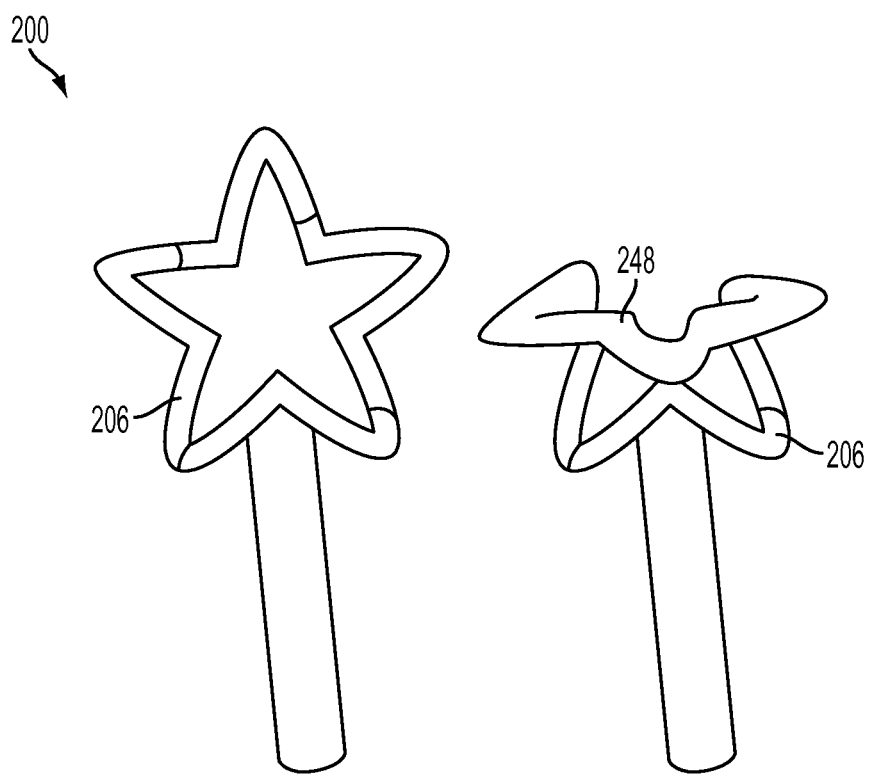
FIGS. 13A and 13B show embodiments of a transmitting coil incorporated into wands and having rotatable portions.
Figure 13B:
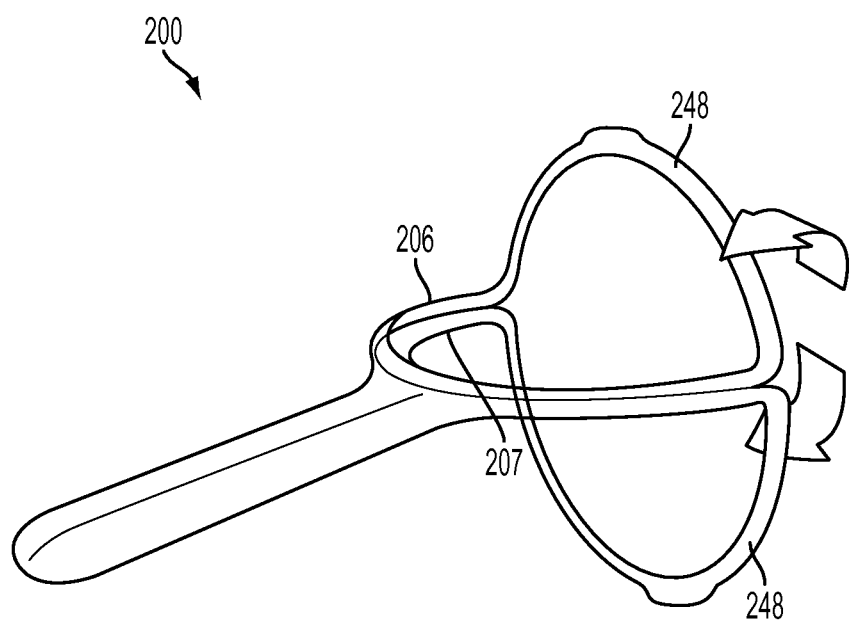

According to some embodiments, the transmitting coil may lie substantially in a first plane, but a portion of the transmitting coil may also extend out of the first plane. For example, the portion may permanently extend out of the first plane, for example, by being curved or angled. Alternatively, the portion may be able to rotate or bend out of this first plane and back into the first plane. For example, FIGS. 13A and 13B show part of a light-emitting toy assembly 200 according to an embodiment where (1) in FIG. 13A, a portion 248 of a first transmitting coil 206 can rotate out of the plane and (2) in FIG. 13B, portions 248 of both a first transmitting coil 206 and a second transmitting coil 207 can rotate out of plane. As a result, the portion 248 alters the electromagnetic field to affect the current induced in the receiving coils. This can produce a different lighting state in a light-emitting object as compared to when the entire transmitting coil 206 is in the first plane.

FIGS. 14A and 14B show examples of circuit board diagrams for the lighting element 116. FIG. 14A shows a lighting element 116 with a single LED 126 and FIG. 14B shows a lighting element 116 with three LEDS 126a-c. The lighting element 116 may include a capacitor 150 connected to each light and to the corresponding one of the receiving coils 114. The capacitor 150 may be used to regulate power or store energy received from the field via the receiving coil 114. The capacitor 150 in combination with the receiving coil 114 may act as an electrical resonator or resonant circuit for achieving a desired inductance matching between a transmitting coil and the receiving coil 114.

In some embodiments, the transmitting coil may be powered by batteries, an AC power source, a DC power source, or any other suitable source of electrical power. The light-emitting toy assembly may provide a space for housing batteries used to power the transmitting coil. In embodiments where the transmitting coil may receive power from an external source, such as an AC or DC power source, the light-emitting toy assembly may not provide a space for storing batteries. Alternatively, the transmitting coil may be optionally powered by either batteries or an AC or DC power source, as desired. For example, in some embodiments, the AC or DC power source may be used to not only power the transmitting coil, but also to charge any batteries provided in the light-emitting toy assembly.

The light-emitting toy assembly may also include a timing chip configured to turn an LED on or off on a timed basis. For example, the timing chip may execute a command to turn off one or more LEDs after those LEDs have been on for a predetermined time. Further, the timing chip may turn an LED on and off repeatedly to form a pulsing light effect or some other lighting sequence according to a timed basis. Such a timing chip may be associated with one or more individual LEDs. Alternatively, the timing chip may be associated with the transmitting coil to turn on or off the transmitting coil in order to affect (e.g., turn on or off) one or more LEDs.

Board Game Embodiment

Figure 15:
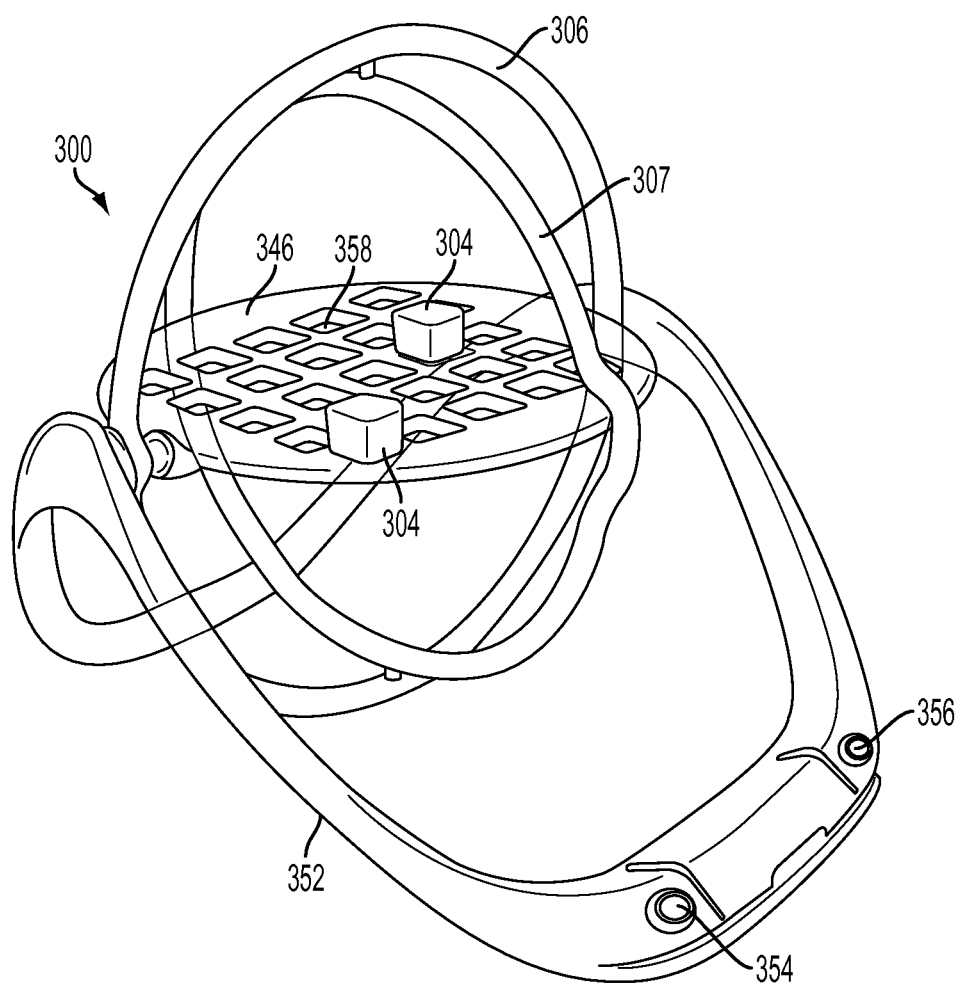
FIG. 15 shows an example of a board game including a light-emitting assembly.

FIG. 15 shows a light-emitting toy assembly 300 according to an example board game embodiment. The assembly 300 can include a platform 346, at least one transmitting coil 306, and a plurality of game pieces 304. The transmitting coil 306 may be positioned substantially around the platform 346 and can generate an electromagnetic field to inductively transfer energy. The game pieces 304 may be positioned on the platform 346, and each of the game pieces 304 can include a body 308, at least one receiving coil 314, and a lighting element 316.

The platform 346 preferably includes a plurality of spaces 358 for placement of the game pieces 304 on the platform 346. A game piece 304 can be positioned so that the game piece 304 rests on a space 358 on any of a number of sides of the game piece 304. The spaces 358 may be formed as simple markings or other demarcations on the platform 346. In some embodiments, the spaces 358 are formed as indentations or holes formed on the platform 346 and in which the game pieces 304 are held. One of ordinary skill in the art will understand based on this disclosure, that game pieces 304 are not limited to cubic shapes, but rather, can have any number of geometric, contoured, or irregular shapes, or combinations thereof. Each game piece can have a construction similar to the object 104 shown in FIGS. 1-3C and discussed above. Accordingly, for the sake of brevity, the various components and possible embodiments of the light-emitting object 102 discussed above will not be repeated here with respect to the game pieces 304.

The toy assembly 300 may also include a stand 352 supporting the platform 346. Additionally, there may be a first transmitting coil 306 and a second transmitting coil 307. The first and second transmitting coils 306, 307 may each be rotatable with respect to the other and with respect to the platform 346. For example, the first transmitting coil 306 may be rotatably mounted on the stand 352. The second transmitting coil 307 may have an axis of rotation that is substantially perpendicular to an axis of rotation of the first transmitting coil 306. As shown in FIG. 10, the second transmitting coil 307 may be rotatably coupled to the first transmitting coil 306 and arranged concentrically with respect to the first transmitting coil 306. As will be appreciated by one of ordinary skill in the art, wires, other electric connections, and power sources may be located within the structural components of the toy assembly.

The game piece 304 can exhibit various lighting states due to the inclusion of two or more LEDs and corresponding receiving coils. These lighting states can be altered to exhibit various colors by manipulating the orientation of the game piece 304 while positioned on the platform 346. The lighting state may also be changed by altering the orientation of the transmitting coils 306 and 307, as previously discussed in connection with FIG. 10.

For example, when one of the game pieces 304 is positioned on the platform 346, it can be oriented such that at least one receiving coil within the game piece 314 is inductively receiving energy. If the game piece 304 is then, for example, rotated by substantially ninety degrees to rest on an adjacent face of the game piece 304, a different receiving coil within the game piece 304 will inductively receive energy. Therefore, whether an LED of the game piece 304 is lit will depend at least, for example, on the rotational orientation of the game piece 304. As discussed above, a similar change in light emitted from the game piece 304 can be achieved by changing the relative position of the game piece 304 within the field by moving the transmitting coil 306 and/or 307 with respect to the platform 346 on which the game piece 304 sits.

As discussed above, the lighting element 316 may emit light from differently colored LEDs, or a single, multi-color LED such as a RGB LED. When LEDs of three different colors are included in the game piece 304, the game piece 304 may exhibit up to six different colors from one or a combination of the three different colors based on a relative rotational orientation between the at least one transmitting coil 314 and the game piece 304.

The transmitting coil 306 and/or transmitting coil 307 can be connected to circuitry housed in the stand 352 and/or platform 346. The assembly 300 may be selectively powered on and off by a player via a button, switch, or other input mechanism on the exterior of the stand 352, platform 346, or other part of the assembly 300. FIGS. 9 and 15 show embodiments with input mechanisms in the form of buttons 354 that may be provided at the base of the stand 352. In a two-button configuration, one button 354a can be used to selectively power the first transmitting coil 306 and the other button 354b can selectively power the second transmitting coil 307. In other embodiments, only a single button 354 may be provided for selectively powering all transmitting coils 306, 307. Power can be supplied by either one or more batteries stored, for example, in the stand 352, or by a DC power supply connected to a power input 356 on the stand 352, for example, from a household AC transformer.

Method of Playing the Board Game

The board game described above can be played in multiple variations according to different embodiments of the board game apparatus as well as different methods and rules for playing the game. Examples of some of rules according to some embodiments of the board game are described below. However, the methods of playing the game are not limited to the descriptions below.

A board game can be played on the board game assembly 300 described above, which includes a platform 346 having at least one transmitting coil 306 that is positioned substantially around the platform 346 and that is configured to inductively transfer energy to a plurality of game pieces 304. Each game piece 304 emits light of a plurality of colors when inductively receiving energy from the transmitting coil 306, and the light emitted has a color that depends on a relative rotational orientation between the game piece 304 and the one or more transmitting coils 306.

The method of playing this board game may include a first player taking a first turn by placing a first game piece on the platform 346. Alternatively, a first game piece can be positioned on the platform 346 before the first player places a game piece. A second player then takes turn by selectively doing one of the following: (1) placing a second game piece on the platform 346, or (2) rotating a game piece that is already on the platform 346 to change a lighting state of that piece. After performing one of these actions, the second player ends that turn by rotating one of the transmitting coils 306, 307 ninety degrees. When the transmitting coil is powered to inductively transfer energy, this rotation will cause a change in the color of the light emitted by each of the game pieces 304 on the platform 346.

Game play proceeds by each player taking successive turns to perform the above-described actions of the second player. Namely, each successive player may either (1) place another game piece on the platform, or (2) rotate a game piece that is already on the platform. That player then ends his or her turn by rotating one of the transmitting coils 306, 307 ninety degrees to change the color of the light emitted by the game pieces on the platform 346. The game is won by a single player when, at the end of the winning player's turn, a predetermined number of game pieces having the same color are arranged in a predetermined pattern. The number of game pieces can be, for example, 4 or 5, or some other number, which can be adjusted to vary the difficulty of the game. The predetermined pattern can be, for example, a line running vertically, horizontally, or diagonally across the platform 346.

This method of playing the board game is not limited to two players. Rather, the game can be played among more than two players taking successive turns.

The difficult of the game can be altered by changing a number of transmitting coils 306, 307 used during game play. For example, only a first transmitting coil 306 may be used to inductively transfer energy. In this case, each player may only rotate the first transmitting coil 306 during each step of rotating one of the at least one transmitting coils. With only one transmitting coil transmitting energy, if each game piece 304 has only three different colored lights, the game piece 304 can change to one of three colors upon changing the relative rotational orientation between the game piece 304 and the first transmitting coil 306. In a more difficult level of game play, both the first transmitting coil 306 and the second transmitting coil 307 inductively transfer energy. In this more difficult case, each player selectively rotates one of the first and second transmitting coils 306, 307 during the step of rotating one of the at least one transmitting coils 306, 307. Due to the presence of two transmitting coils, the game pieces 304 may change to one of six colors upon changing the relative rotational orientation between the game piece 304 and the transmitting coils 306, 307. Thus, more colors will appear on the platform and it may be more difficult to achieve the predetermined number and pattern of game piecing having the same color.

Doll Embodiment

As discussed above, a light-emitting toy assembly 200 according to some embodiments may comprise a toy set including a light-emitting doll or figurine and various play sets and/or accessories for the doll. FIGS. 16-19 show a light-emitting toy assembly according to this embodiment. Examples of this embodiment are also shown in FIGS. 4, 6, and 13, which were discussed above. The toy set 200 of FIG. 16 can include a field generator 202 including at least one transmitting coil 206 to inductively transmit energy. The toy set 200 can also include a platform 246 for supporting one or more of the dolls. The doll 204 has an exterior of which at least a portion 220 is translucent. As shown in FIG. 19, the exterior confines an interior cavity 260. Within the cavity 260 are at least one receiving coil (not pictured) to inductively receive energy from the at least one transmitting coil 206. For clarity, FIG. 19 shows cores 218 without the receiving coils. The lighting element is also not pictured in FIG. 19, but an embodiment of the lighting element 216 attached to a set of receiving coils 214 can be seen in FIG. 4A.

In some embodiments, the translucent portions 220 represent certain features of the doll such as the hair, eyes, stomach, or other features or body parts. Additionally, separate LEDs or lighting elements may be provided in different portions of the doll 204, as shown by the separate sets of cores 218a and 218b in the head and torso of the doll 204 in FIG. 19.

The at least one transmitting coil 206 and the doll 204 are relatively movable with respect to each other so that a relative position or orientation of the two can be altered to alter a lighting state of the doll. Specifically, altering a relative orientation or position can alter which, if any, of the receiving coils within the doll 204 inductively receives energy, similar to the embodiments described above.

Figure 18:
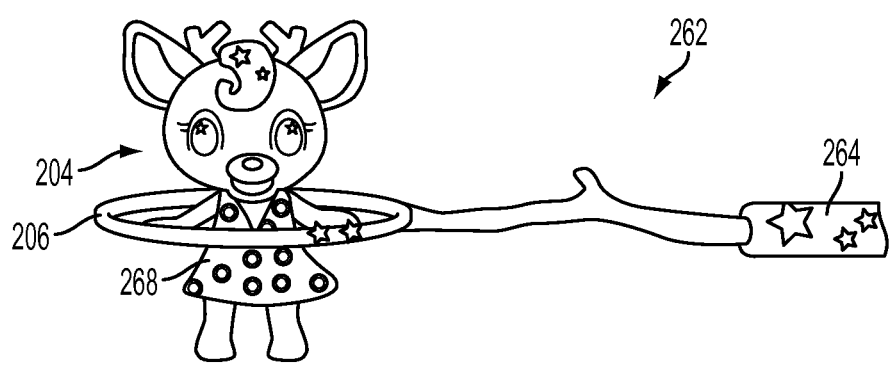
FIG. 18 shows an embodiment of a doll and transmitting coil in the form of a wand.
Figure 19:
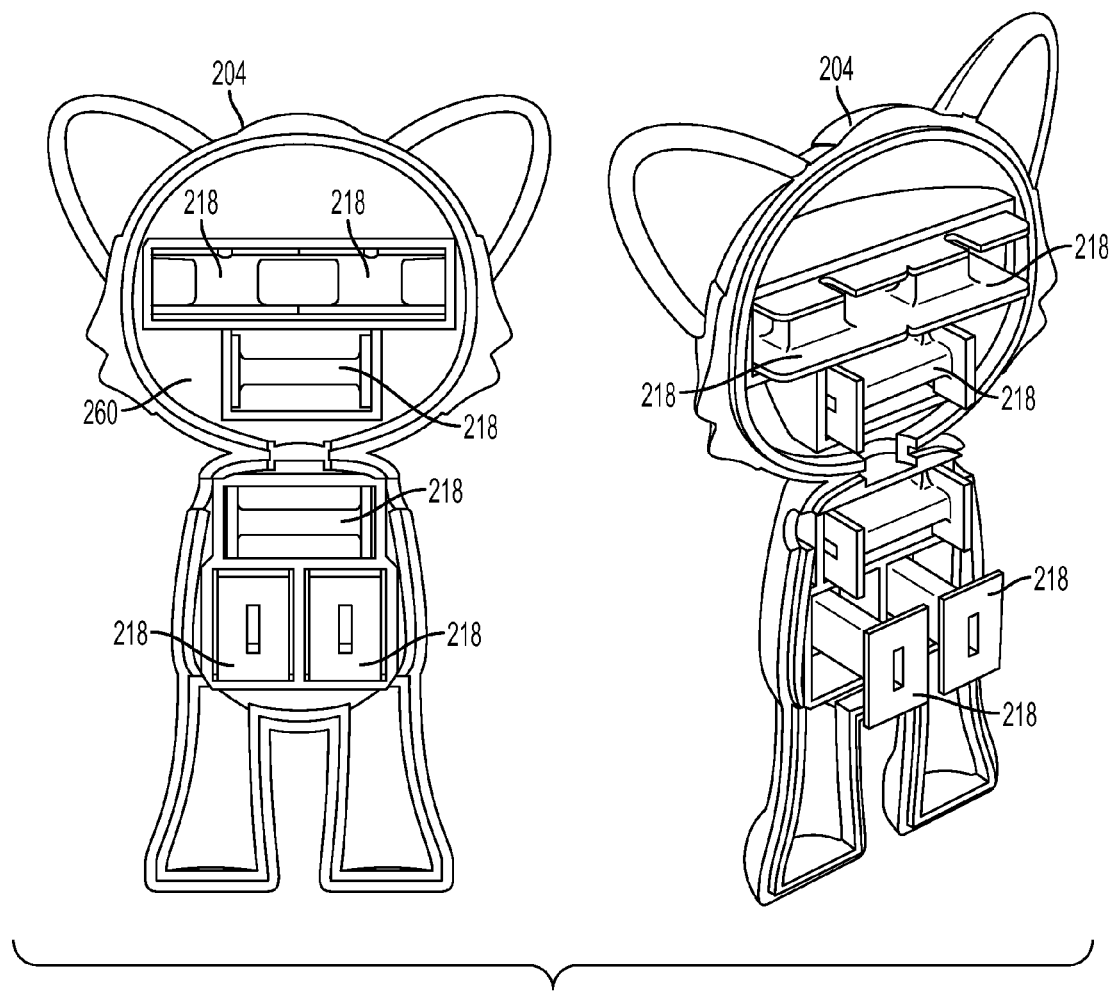
FIG. 19 is a partially exploded view of an embodiment of a doll with two sets of three cores in the interior cavity of the doll.

FIG. 18 shows an embodiment where the field generator 202 resembles a wand 262 that can be held by a handle portion 264 so that a transmitting coil 206 disposed on the end of the wand 262 is positioned near the doll 204 to inductively transmit energy to the doll 204. FIG. 13, which was discussed above, shows examples of embodiments where a portion 248 of the transmitting coil 206 is rotatable into a second plane. The transmitting coil can transmit energy to one or more receiving coils in the doll 204 to illuminate one or more corresponding lighting elements in the doll 204.

Figure 16:
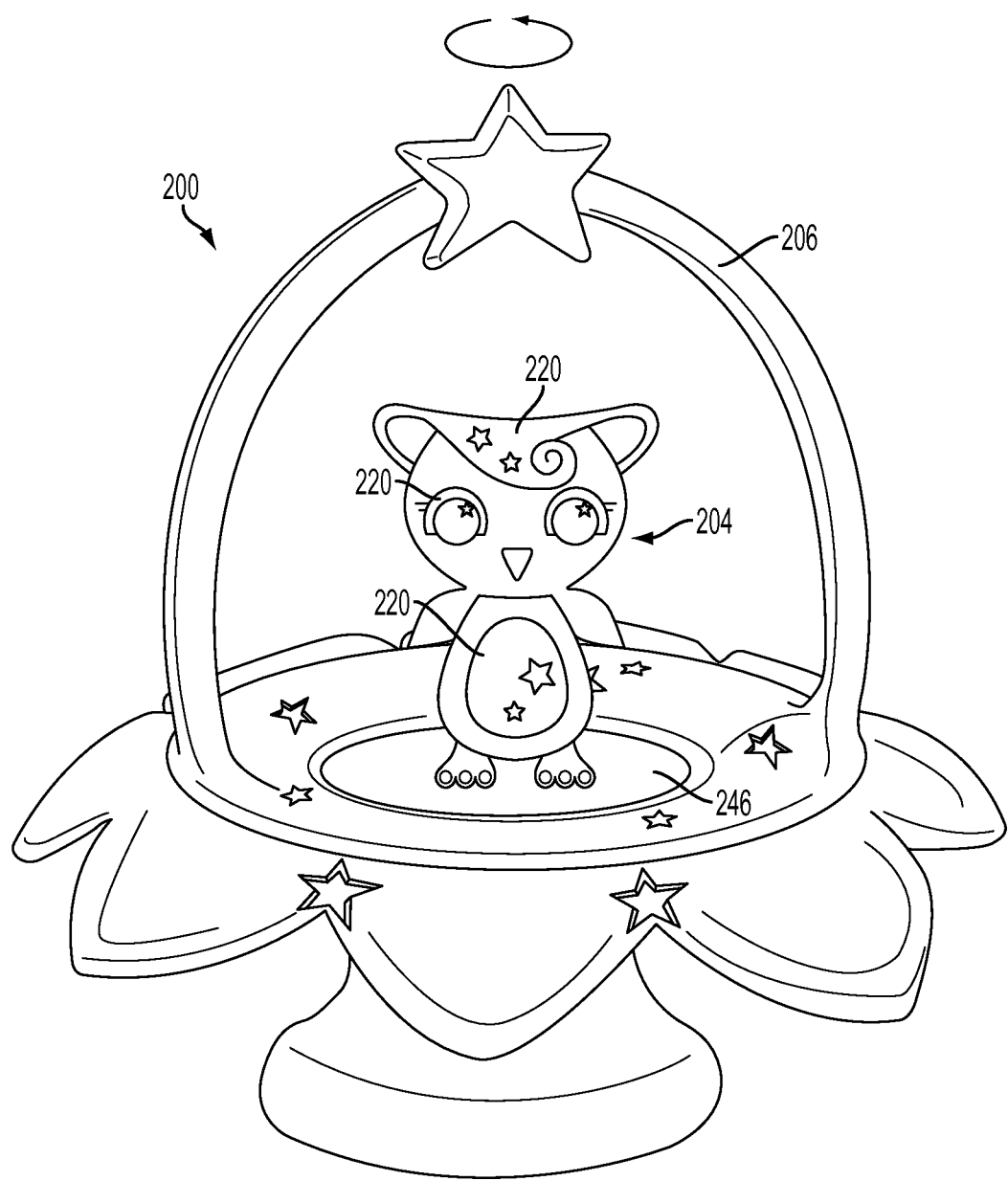
FIG. 16 shows an embodiment of a doll and play set including a light-emitting assembly.

As mentioned above, the field generator 202 may also include a platform 246 to support the doll 204. The transmitting coil 206 may be located in or under the platform 246, or may be positioned above or around the platform 246. For example, at least a part of the transmitting coil 206 may form an arch 266 over the platform 246, as shown in FIG. 16. The transmitting coil 206 is optionally rotatable with respect to the platform 246 so that the doll 204 can be placed on the platform 246 while the transmitting coil 206 is rotated with respect to the doll 204. In an embodiment, the arch 266 can be rotated as indicated by the arrow in FIG. 16.

A particular receiving coil in a doll 204 may be tuned or inductively matched to only inductively receive energy from one or more particular transmitting coils, but not to receive energy from other transmitting coils. Therefore, the doll 204 can light up with the color of the LED corresponding to those particular receiving coils only when in the field of those particular transmitting coils. In this way, an interactive toy experience is provided where the doll must be matched to certain settings, accessories, or wands to exhibit a certain light color.

Figure 17:
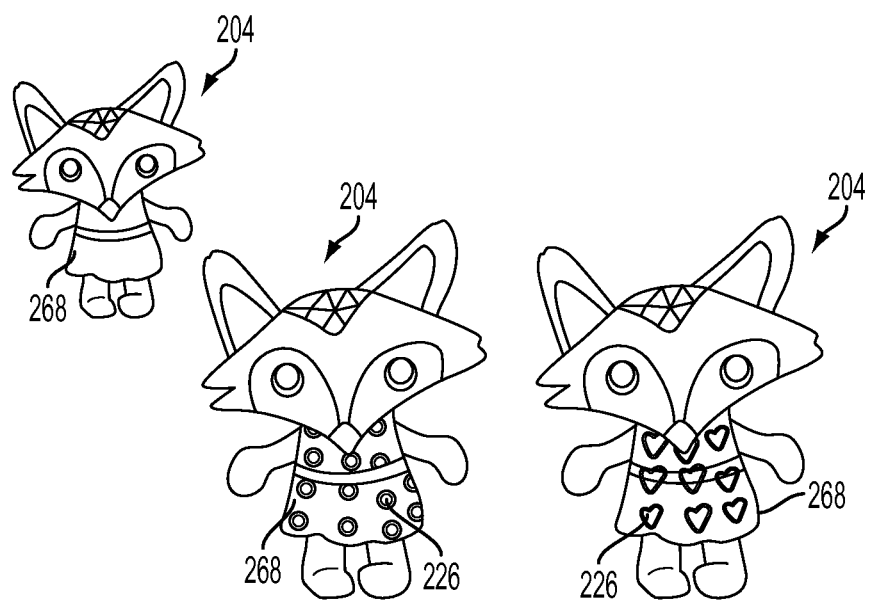
FIG. 17 shows embodiments of a doll with light-emitting clothing.

As shown in FIGS. 17 and 18, the toy set 200 may also include accessories 268 for the doll 204, including, for example, clothing or other items that can accompany, be worn by, or be attached to the doll 204. These accessories may also emit light when inductively receiving energy from a transmitting coil 206 in a way similar to the doll 204. For example, different receiving coils (not pictured) in the accessories 268 can be connected to corresponding LEDs 226 to emit differently colored lights or light patterns in the accessory, as shown in FIG. 17.

In some embodiments, the toy set 200 may also include a timing chip (not pictured) to control an on or off state of one or more LEDs according to a timed basis. The timing chip may be provided within the doll 204 or electrically coupled to the accessory 268. The timing chip may turn off an LED that has been on for a predetermined amount of time, or may turn off an LED based on an amount of time after which the receiving coil of the LED is removed from the field of the transmitting coil. Alternatively, the timing chip may turn on an LED only after a predetermined time during which the LED is off and receiving a current. Further, the timing chip may execute a series of on and off commands to achieve a pulsing light or other light sequence on a timed basis. In some embodiments, the timing of the on or off state of the LED, or the pattern of the light sequence may signify an emotion of or communication by the doll.

Building Set Embodiment

FIG. 12 shows the light-emitting toy assembly according to a building set embodiment. The building block set 400 can include at least one transmitting coil 406 to inductively transmit energy to a plurality of building blocks 404, similar to aspects of the above described embodiments. The plurality of building blocks 404 may have a construction similar to aspects of the objects 104 or game pieces 304 described above. For brevity, those aspects will not be repeated here in full. The set 400 also includes a platform 446 to support the building blocks 404. The transmitting coil 406 in FIG. 12 is rotatably attached to the platform 446. For example, the transmitting coil 406 may rotate from a first position where it is substantially parallel to the platform 446, to a second position where it is substantially perpendicular to the platform 446. In this way, the relative orientation of the transmitting coil 406 and the building blocks 404 on the platform 446 can be altered to affect the lighting state of the blocks 404. Additionally, the set 400 is not limited to one transmitting coil, but may have multiple transmitting coils.

Each building block 404 may be magnetic to magnetically attract other building blocks 404. In some embodiments, the building blocks 404 may have attachment members such as inter-locking pieces to assist in building structures with the building blocks. The building blocks 404 may be made of varying or uniform sizes, and are not limited to any particular size or shape. However, in an embodiment, the building blocks 404 may be cubes of approximately 25 mm on each side.

Figure 20:
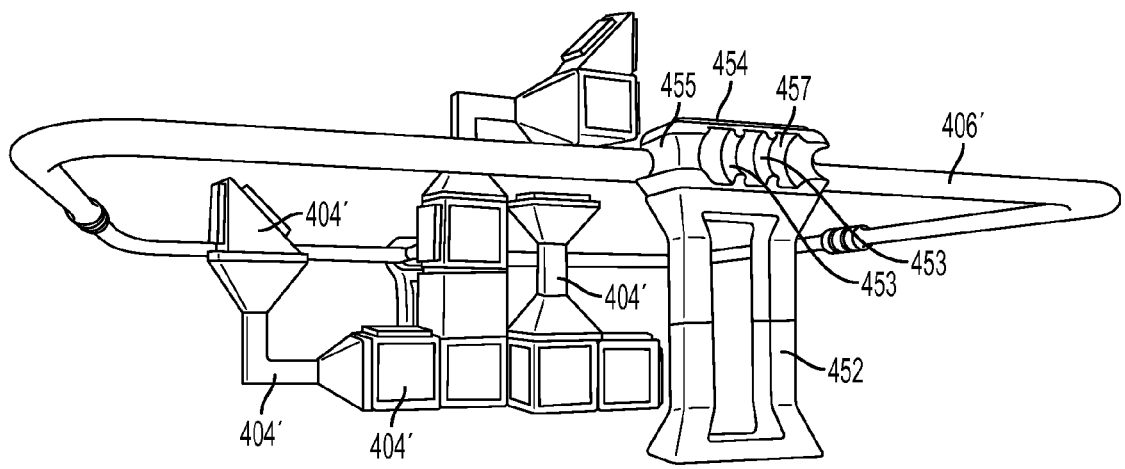
FIG. 20 shows an embodiment of a building block set incorporating a light emitting assembly.

FIG. 20 shows the light-emitting toy assembly according to a second building set embodiment. The building block set includes building blocks 404' of various shapes and sizes. Though not pictured in FIG. 20, the building blocks 404' may have similar internal components as the building blocks 404 described above, enabling the building blocks 404' to emit light. In addition, the various shapes of the building blocks 404' allows for flexibility in the placement or arrangement of the light-emitting components with the blocks, including receiving coils, lighting elements, and LEDs, although such flexibility is not limited to this embodiment. The building blocks 404' can be stacked or connected face-to-face, as shown in the various blocks 404' of FIG. 20. The transmitting coil 406' is shown supported on a support structure 452. The support structure 452 shown in FIG. 20 is just one example of a support structure for the receiving coil, but is not limited to the embodiment shown. A power supply unit 455 may be supplied on top of the support structure 452, and may have gripping portions 453, a power button 454, and electrical contacts 457.

Figure 21:
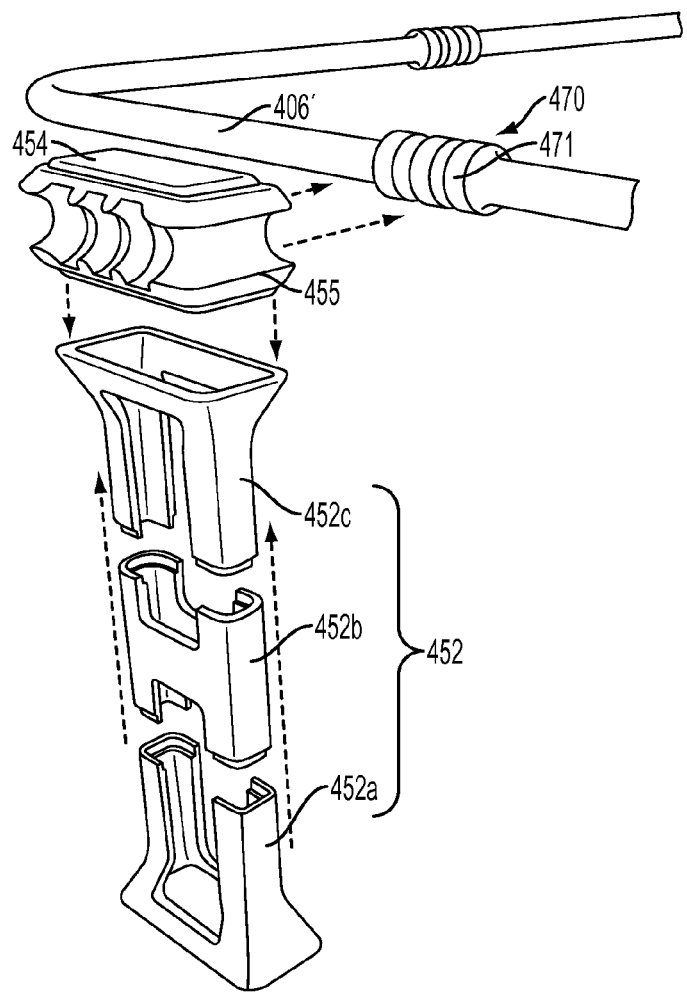
FIG. 21 shows a partially exploded view of an aspect of the embodiment in FIG. 20.

As shown in FIG. 21, the power supply unit 455 can be connected to a power receiving portion 470 of the transmitting coil 406'. The power receiving portion 470 may have electrical contacts 471 for making electrical contact with the electrical contacts 457 of the power supply unit 455. Accordingly, the power supply unit 455 may be used to control a current flowing in the transmitting coil 406'. The support structure 452 may comprise multiple support structure components 452a, 452b, 452c that are stackable or connectable to form the support structure 452.

In some embodiments, the power supply unit 455 may supply power via a battery, or AC or DC power source. Alternatively, the power supply unit 455 may merely operate as a switch to open and/or close a current flow path around the transmitting coil 406'. In either case, the power button 454 may be operated to start and stop a current flow in the transmitting coil 406'. Multiple power receiving portions 470 may be supplied around the transmitting coil 406'.

Figure 22:
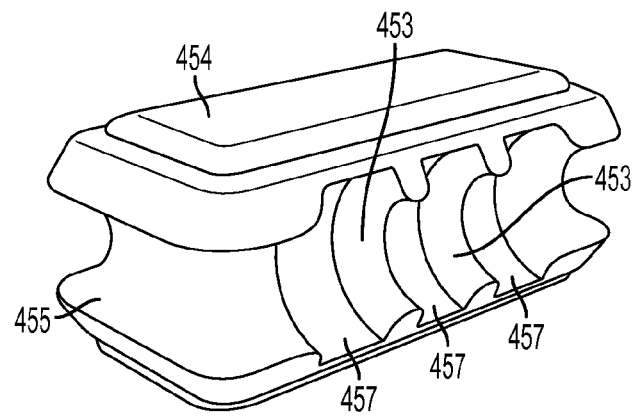
FIG. 22 shows an aspect of the embodiment shown in FIGS. 20 and 21.

FIG. 22 shows a close-up of the power supply unit 455, which may have, for example, three electrical contacts 457. The gripping portions 453 may be formed as a partial ring shape, for example, a partial torus shape, that corresponds to a shape of a part of the power receiving portion 470 of the transmitting coil 406'. Accordingly, the power supply unit 455 may be attached to the power receiving portion 470. The gripping portions 453 may be configured to allow for easy removable and re-attachment of the power supply unit 455 to one or more power receiving portions 470.

Additional Toy Embodiment

Figure 23:
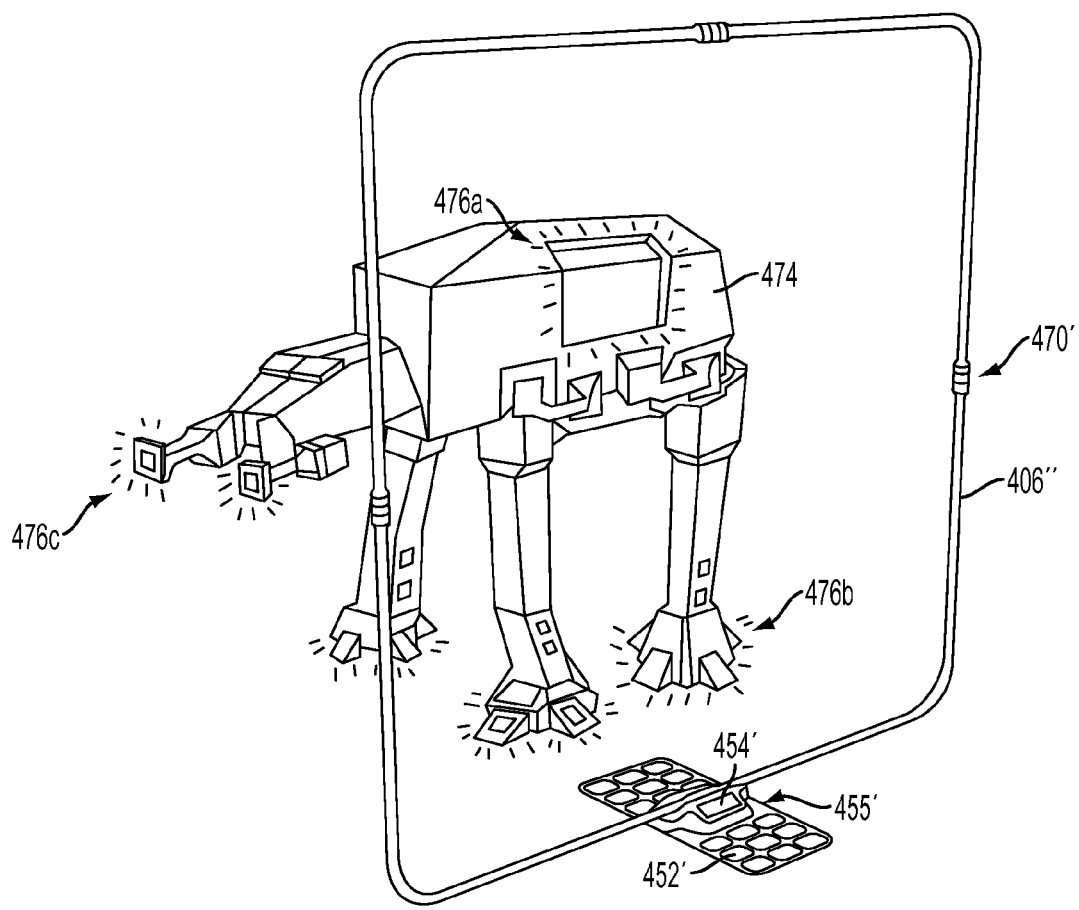
FIG. 23 shows an embodiment of a light emitting toy assembly.

FIG. 23 shows a toy embodiment including a transmitting coil 406" that may have a plurality of power receiving portions 470'. The toy may also include a stand 452' that includes a power supply unit 455' and power button 454'. The transmitting coil 406" may be connected to the stand 452' and power supply unit 455' so that the transmitting coil 406" may have a current. As shown in FIG. 23, the transmitting coil 406" may stand vertically out of the stand 452', but the embodiment is not limited to the arrangement shown and, for example, may be inclined with respect to the vertical or may have a different shape. The example shown in FIG. 23 includes a toy 474 that may contain one or more lighting elements 476a, 476b, and 476c. The lighting elements 476a-476c may have similar components to the light-emitting elements described above, and the toy 474 may have portions permitting light from the light-emitting elements to be emitted therefrom. The various embodiments of the light elements and the possible light effects discussed above may also apply to this embodiment, though those details discussed above will not be repeated here. Accordingly, the lighting elements 476a-476c may be lit from energy inductively received from the transmitting coil 406".

Figure 24:
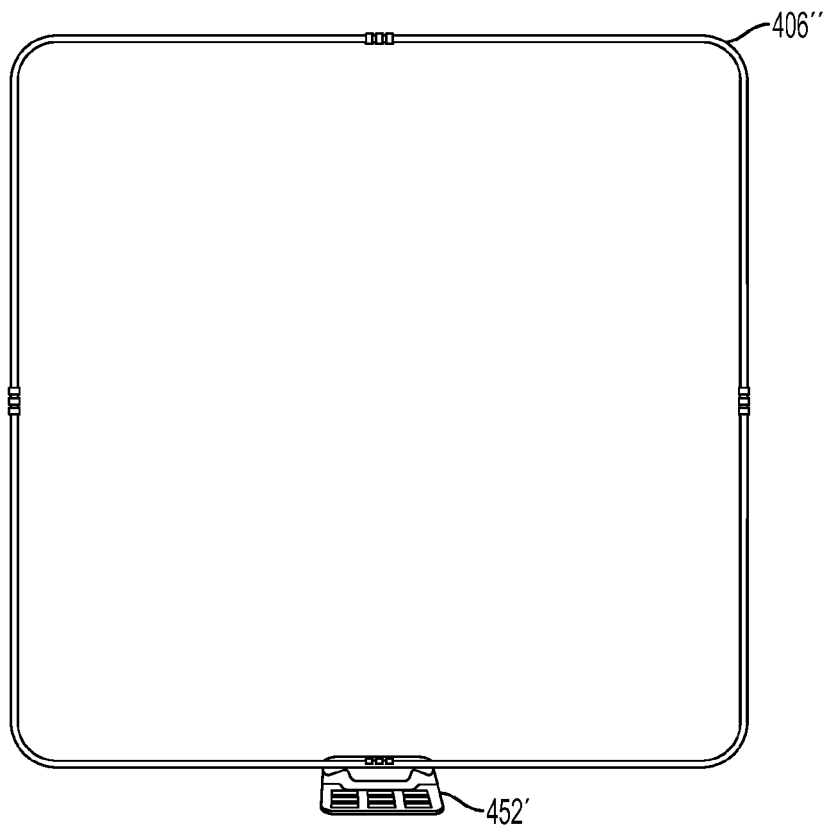
FIG. 24 shows a transmitting coil according to the embodiment shown in FIG. 23.

FIG. 24 shows another view of the transmitting coil 406" and stand 452' shown in FIG. 23 and discussed above.

Figure 25:
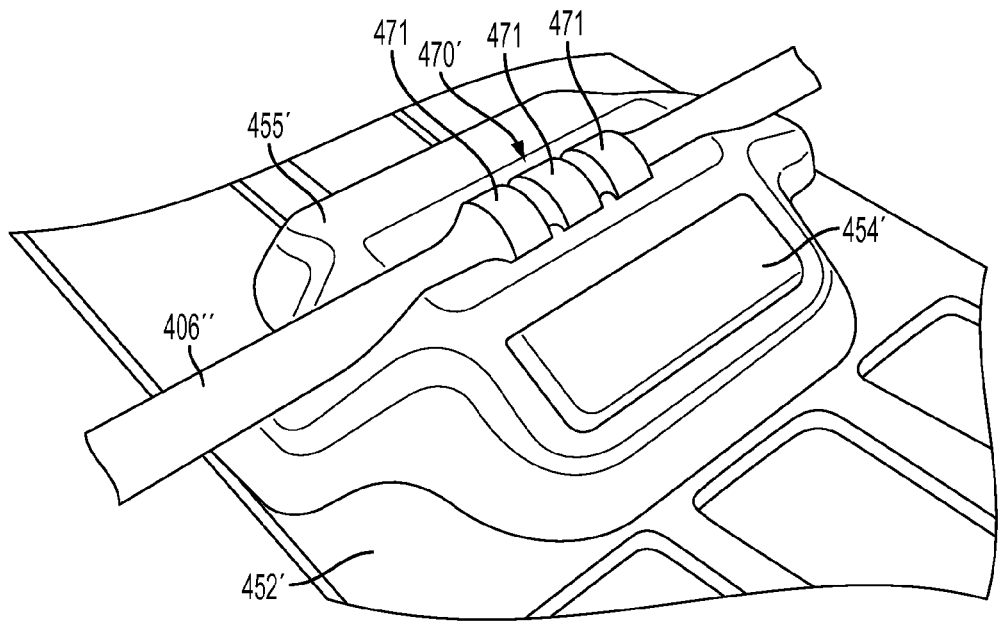
FIG. 25 shows an aspect of the transmitting coil and a base of the embodiment shown in FIGS. 23 and 24.

FIG. 25 shows a close-up of the power supply unit 455' and stand 452'. The power receiving portion 470' of the transmitting coil 406" is connected to the power supply unit 455' in such a way that the power button 454' can be operated to turn on or off the transmitting coil 406".

EXAMPLES

The following are examples of design of circuits used in some embodiments. These are meant to be examples only.

The generated voltage in an inductor is:

$$V = L\frac{di}{dt} \quad (1)$$

L is the inductance, i is current through the inductor. This equation means higher current or higher inductance can generate higher voltage at two terminals of the inductor. Because a sine wave is applied in the circuit, then i=A sin ωt, where A is the amplitude of the current and ω is the frequency of the current. The voltage equation can be rewritten as:

$$V = L\frac{di}{dt} = AL\omega\cos\omega t \quad (2)$$

This means the voltage is a function of inductance, amplitude and frequency of the current. From this, the following guidelines apply to some of the embodiments of the current invention.

First, the current through the circuit might be as high as, for example, 100 mA-150 mA, depending on the components used in a given embodiment. If the current is too high, excess heat can be generated which can negatively impact performance or degrade the components such as the resistors or capacitors. Second, inductance is limited by the volume of the inductor. Higher inductance can prevent higher frequency current from getting through. Third, with current of, for example, 100 mA, and inductance limited, the only other parameter that can be changed is the frequency. However, too high of a frequency will not pass through the inductor. Some embodiments use a frequency of between about 50 and 150 KHz, more particularly, between about 75 and 125 KHz, such as about 100 KHz.

Calculation of Transmitting Coils

The power or field generator (oscillating circuit) may be based on inductance connecting a three point type oscillator. The frequency of the oscillating circuit can be calculated based on:

$$f = \frac{1}{2\pi\sqrt{LC}} \quad (3)$$

In the above equation, L is the total inductance of all coils. For example, when there are two coils in the circuit, the total inductance can be calculated as L=L1+L2+M, where M is the mutual inductance between L1 and L2. With the frequency in the circuit being, for example, 100 KHz, and the capacitor being predefined as 47 nF, the inductance of each coil can be readily computed as approximately L1=L2=8.6 uH. This means if we choose a capacitor of 47 nF, wiring 2 coils with inductance of about 8.5 uH, we will get about 100 KHz frequency current through the oscillator as a power or field generator for the small coils.

Calculation of Receiving Coils

The larger the volume of the coil, the bigger energy it will absorb from the magnetic field generated by the oscillating circuit inductor, and the brighter the LED could be. Practically, the size of receiving coils may mainly be defined by the light-emitting body itself. In other words, the size of the light-emitting body or block is the upper limit of a coil's diameter. In the case of using a simple LC oscillator to acquire energy for the receiving coil, the frequency equation of the LC oscillator is $$f = \frac{1}{2\pi\sqrt{LC}} \quad (4)$$

Therefore, if the frequency is 100 Khz, as discussed above, and the capacitor value is selected to be 820 nF, then the inductance of the coil can be readily calculated as around 2.7 mHz. Thus, winding the receiving coil using magnet wire up to a value around 2.7 mHz may achieve the highest oscillating voltage in the LC circuit to drive the LED.

In some embodiments, a 36 gauge magnet wire (such as copper wire) was used to wind the receiving coil, however, other gauges such as 20-60 gauge, more specifically, 30-40 gauge, are possible. This may allow space savings while having sufficient inductance. The length of the magnet wire can be calculated from the following experience equation:

$$l = \frac{0.01*D*D*N}{\frac{L}{D} + 0.44} \quad (5)$$

In the above equation, l is the inductance to be winded in units of mH; D is the diameter of the coil in units of cm; N is the winding circles; and L is the length of the coil. According to embodiments, l is around 2.5 mH, D and L are to be defined by the blocks or other game piece's inner size, and thus N can be calculated.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A toy assembly, comprising:
    a field generator that includes a first transmitting coil configured to inductively transmit energy; and
    an object that includes:
        a body,
        a plurality of receiving coils that are each configured to inductively receive energy from the first transmitting coil, the plurality of receiving coils comprising a first receiving coil with a central axis oriented in a first direction and a second receiving coil with a central axis oriented in a second direction that is different from the first direction, and a plurality of electrical components that are each configured to receive a current from a corresponding one of the plurality of receiving coils, wherein at least one of the first transmitting coil and the object is movable with respect to the other of the first transmitting coil and the object, and a change in a rotational orientation of at least one of the first transmitting coil and the object alters the current received by the plurality of electrical components.

2. The toy assembly of claim 1, wherein
the energy received by each of the plurality of receiving coils varies based on a relative orientation between the first transmitting coil and the object.

3. The toy assembly of claim 1, wherein at least one of the plurality of electrical components comprises light emitting diodes.

4. The toy assembly of claim 1, wherein the central axis of the first receiving coil is substantially perpendicular to the central axis of the second receiving coil.

5. The toy assembly of claim 1, further comprising:
a second transmitting coil configured to inductively transmit energy,
wherein the at least one of the plurality of receiving coils is further configured to inductively receive energy from the second transmitting coil.

6. The toy assembly of claim 5, wherein a relative orientation between the second transmitting coil and the first transmitting coil is variable.

7. The toy assembly of claim 5, wherein at least one of the plurality of receiving coils of the object is configured to inductively match with the first transmitting coil and is configured not to inductively match with the second transmitting coil.

8. The toy assembly of claim 7, wherein at least one of the plurality of receiving coils of the object is configured to inductively match with the second transmitting coil and is configured not to inductively match with the first transmitting coil.

9. The toy assembly of claim 1, further comprising:
a passive coil configured to have a current induced by the first transmitting coil,
wherein the current induced in the passive coil expands a field of electromagnetic energy of the assembly to increase a range in which energy can be inductively transmitted to the plurality of receiving coils.

10. The toy assembly of claim 1, wherein the first transmitting coil includes a first inductor and a second inductor, the first inductor and the second inductor being coils aligned along a common central axis and having inverse polarities.

11. The toy assembly of claim 1, further comprising a platform that is integral with the field generator and that is configured to support the object.

12. The toy assembly of claim 1, wherein the object further comprises at least one core around which a corresponding one of the plurality of receiving coils is wound.

13. The toy assembly of claim 12, wherein the at least one core is magnetic.

14. The toy assembly of claim 1, wherein the first transmitting coil lies substantially in a first plane, and wherein a portion of the first transmitting coil extends out of the first plane.

15. The toy assembly of claim 1, wherein each of the plurality of receiving coils has a different construction.

16. The toy assembly of claim 15, wherein each of the plurality of receiving coils is a differently shaped coil.

17. The toy assembly of claim 3, wherein at least a portion of the body is translucent, and the object further includes a diffuser to diffuse light emitted by the at least one light emitting diode.

18. The toy assembly of claim 1, further comprising:
an additional object that includes:
a body,
a plurality of receiving coils that are each configured to inductively receive energy from the first transmitting coil, the plurality of receiving coils comprising a first receiving coil with a central axis oriented in a first direction and a second receiving coil with a central axis oriented in a second direction that is different from the first direction, and
a plurality of electrical components configured to receive a current from a corresponding one of the plurality of receiving coils,
wherein at least one of the plurality of receiving coils of the object is inductively matched to the at least one transmitting coil and at least one of the plurality of receiving coils of the additional object is not inductively matched to the at least one transmitting coil.

19. The toy assembly of claim 1, further comprising a timing chip electrically coupled to at least one of the transmitting coil and the plurality of electrical components and configured to control the state of the plurality of electrical components according to a timed basis.

20. The toy assembly of claim 3, further comprising a coating on the body of the object, the coating having an outwardly reflective appearance and being translucent to light emitted by the plurality of light emitting diodes.

21. A light-emitting toy assembly, comprising:
an induction transmitting coil in a first housing;
a plurality of induction receiving coils in a second housing separate from the first housing, at least one of the plurality of induction receiving coils having a central axis that is oriented in a different direction than a central axis of at least one other of the plurality of induction receiving coils; and
at least one light in the second housing that is connected to at least one of the plurality of induction receiving coils, wherein
at least one of a relative orientation and relative position between the induction transmitting coil and the plurality of induction receiving coils is variable.

22. The light-emitting toy assembly of claim 21, wherein the central axis that is oriented in the different direction is substantially perpendicular to a direction of the central axis of the at least one other of the plurality of induction receiving coils.

23. The light-emitting toy assembly of claim 21, further comprising:
a capacitor connected to the at least one light and the at least one induction receiving coil.

24. The light-emitting toy assembly of claim 21, further comprising:
a current limit inductor in the first housing connected to the induction transmitting coil in series;
a plurality of capacitors in the first housing;
a plurality of resistors in the first housing; and
a plurality of transistors in the first housing.

25. The light-emitting toy assembly of claim 21, wherein the induction transmitting coil comprises two inductors that are aligned substantially vertically along a common central axis and that have inverse polarity.

26. The light-emitting toy assembly of claim 21, wherein the at least one light comprises a plurality of lights of different colors.

27. The light-emitting toy assembly of claim 21, wherein the at least one light is a light emitting diode.

28. The light-emitting toy assembly of claim 21, wherein each of the plurality of induction receiving coils is wound around a core.

29. The light-emitting toy assembly of claim 28, wherein the core is made of a magnetic material.

30. The light-emitting toy assembly of claim 21, further comprising:
   a diffuser disposed between the at least one light and at least a part of the second housing.

31. A toy set comprising:
   a field generator including at least one transmitting coil configured to inductively transmit energy; and
   a doll having an exterior confining an interior cavity containing:
   a plurality of receiving coils configured to inductively receive energy from the at least one transmitting coil, the plurality of receiving coils comprising a first receiving coil with a central axis oriented in a first direction and a second receiving coil with a central axis oriented in a second direction that is different from the first direction, and
   a plurality of electrical components configured to receive a current from a corresponding one of the plurality of receiving coils,
   wherein the at least one transmitting coil and the doll are relatively movable with respect to each other, and
   wherein a relative movement of the doll with respect to the at least one transmitting coil alters the current received by the plurality of electrical components.

32. The toy set of claim 31, wherein the first direction is substantially perpendicular to the second direction.

33. The toy set of claim 32, wherein at least one of the electrical components comprises a light.

\* \* \* \* \*